(12) United States Patent
Kim et al.

(10) Patent No.: US 12,031,834 B2
(45) Date of Patent: Jul. 9, 2024

(54) METHOD, APPARATUS, ELECTRONIC DEVICE, COMPUTER PROGRAM, AND COMPUTER READABLE RECORDING MEDIUM FOR MEASURING INTER-VEHICLE DISTANCE BASED ON VEHICLE IMAGE

(71) Applicant: THINKWARE CORPORATION, Seongnam-si (KR)

(72) Inventors: Shin Hyoung Kim, Seongnam-si (KR); Tae Kyu Han, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 0 days.

(21) Appl. No.: 18/144,333

(22) Filed: May 8, 2023

(65) Prior Publication Data

US 2023/0273033 A1    Aug. 31, 2023

Related U.S. Application Data

(63) Continuation of application No. 17/151,881, filed on Jan. 19, 2021, now Pat. No. 11,680,813.

(30) Foreign Application Priority Data

Jan. 21, 2020 (KR) .................. 10-2020-0007865
Jan. 18, 2021 (KR) .................. 10-2021-0006462

(51) Int. Cl.
*G01C 21/36* (2006.01)
*B60W 60/00* (2020.01)
(Continued)

(52) U.S. Cl.
CPC ....... *G01C 21/3602* (2013.01); *B60W 60/001* (2020.02); *G06F 18/213* (2023.01);
(Continued)

(58) Field of Classification Search
None
See application file for complete search history.

(56) References Cited

U.S. PATENT DOCUMENTS 11,308,641 B1 * 4/2022 Porta ................. G06T 7/74
2006/0204039 A1   9/2006 Maemura et al.
(Continued)

FOREIGN PATENT DOCUMENTS

CN     1834583 A    9/2006
CN   101029823 A    9/2007
(Continued)

OTHER PUBLICATIONS

Office Action dated Aug. 3, 2022, issued in counterpart CN Application No. 202110076340.2, with English Translation. (25 pages).
Extended European Search Report dated May 26, 2021, issued in counterpart EP application No. 21152509.2. (8 pages).

*Primary Examiner* — Leon Flores
(74) *Attorney, Agent, or Firm* — WHDA, LLP

(57) ABSTRACT

A method for measuring an inter-vehicle distance includes acquiring a driving image photographed by a photographing device of a first vehicle which is being driven; detecting a second vehicle from the acquired driving image; detecting first feature points of a second vehicle region in a first frame corresponding to a frame in which the second frame is detected before a frame in which the second vehicle is not detected among a plurality of frames constituting the driving image, when the second vehicle is not detected from the driving image; detecting second feature points in a second frame corresponding to a current frame by tracking the detected first feature points; calculating a feature point change value between the first feature points and the second feature points; and calculating an inter-vehicle distance from the photographing device of the first vehicle to the second vehicle based on the calculated feature point change value.

17 Claims, 24 Drawing Sheets

(51) Int. Cl.
*G06F 18/213* (2023.01)
*G06F 18/214* (2023.01)
*G06N 3/08* (2023.01)
*G06V 10/25* (2022.01)
*G06V 10/764* (2022.01)
*G06V 20/40* (2022.01)
*G06V 20/58* (2022.01)

(52) U.S. Cl.
CPC ............ *G06F 18/214* (2023.01); *G06N 3/08* (2013.01); *G06V 10/25* (2022.01); *G06V 10/764* (2022.01); *G06V 20/41* (2022.01); *G06V 20/58* (2022.01); *B60W 2420/403* (2013.01)

(56) References Cited

U.S. PATENT DOCUMENTS

2018/0068459 A1 3/2018 Zhang et al.
2018/0114078 A1 4/2018 Tokita
2020/0166897 A1* 5/2020 Campos ................ B60W 40/09

FOREIGN PATENT DOCUMENTS

| CN | 101399969 A | 4/2009 |
| CN | 109532662 A | 3/2019 |
| DE | 102013022050 A1 | 6/2015 |
| JP | 2011-022995 A | 2/2011 |
| WO | 2012/005377 A1 | 1/2012 |

* cited by examiner 1502  1501

1602   1601

METHOD, APPARATUS, ELECTRONIC DEVICE, COMPUTER PROGRAM, AND COMPUTER READABLE RECORDING MEDIUM FOR MEASURING INTER-VEHICLE DISTANCE BASED ON VEHICLE IMAGE

CROSS-REFERENCE TO RELATED APPLICATION(S)

This application is a continuation of U.S. application Ser. No. 17/151,881 filed Jan. 19, 2021, which claims benefit of priority to Korean Patent Application No. 10-2020-0007865 filed on Jan. 21, 2020 and Application No. 10-2021-0006462 filed on Jan. 18, 2021 in the Korean Intellectual Property Office, the disclosure of which is incorporated herein by reference in its entirety.

BACKGROUND

1. Field

The present invention relates to a method, an apparatus, an electronic device, a computer program, and a computer readable recording medium for measuring an inter-vehicle distance based on a vehicle image, and more particularly, to a method, an apparatus, an electronic device, a computer program, and a computer readable recording medium for measuring an inter-vehicle distance that measures a distance between vehicles located in close proximity to each other through feature point tracking of a vehicle image.

2. Description of Related Art

It is most important to safely drive a vehicle and prevent a traffic accident at the time of driving the vehicle. To this end, various assistance apparatuses performing an attitude control of the vehicle, a function control of components of the vehicle, and the like, and safety apparatuses such as a seat belt, an air bag, and the like, have been mounted in the vehicle.

In addition, apparatuses such as a black box and the like positioned in the vehicle and storing a driving image of the vehicle and data transmitted from various sensors to thereby find out a cause of an accident of the vehicle at the time of occurrence of the accident have recently been provided in the vehicle. Portable terminals such as a smartphone and a tablet in which a black box application, a navigation application, or the like may be mounted are used as the apparatuses for a vehicle as described above.

In recent years, advanced driver assistance systems (ADAS) have been developed and distributed to assist the driving of the driver of the vehicle by using the driving image photographed while driving of the vehicle, thereby increasing convenience as well as safe driving of the driver.

Among functions provided by such an ADAS, a forward collision warning system (FCWS) is a function of detecting a front vehicle located in front of a vehicle's driving route from a photographed driving image, measuring a distance from the detected front vehicle, and informing the driver that there is a risk of collision depending on the distance.

That is, for FCWS, it is necessary to detect the front vehicle. Conventionally, in order to detect the front vehicle, an image processing method using a shadow of the front vehicle of the photographed driving image or a machine learning method that learns and detects numerous vehicle images was used. Both of the methods improve detection performance when a vehicle region including a lower portion of the vehicle exists in the driving image.

However, the vehicle encounters various driving environments while driving, and a situation in which the lower portion of the vehicle is not included in the driving image may also occur. As an example, in a process of finding the front vehicle while the vehicle is driving and reducing a driving speed, a distance between the vehicle and the front vehicle becomes very close. As illustrated in FIG. 1, in a case in which a distance between a vehicle 1 and a front vehicle 2 is far (2-1), in a driving image photographed through the vehicle 1, a vehicle image including a lower portion of the front vehicle may be included in the driving image. However, when the distance between the vehicle 1 and the front vehicle 2 becomes close (for example, within 10 m) (2-2), the lower portion of the front vehicle is not included in the driving image.

As such, in the case in which the distance between the front vehicle and the vehicle is close while the vehicle is driving and the lower portion of the front vehicle is not included in the driving image, there is a problem in that the front vehicle is not properly detected with the existing shadow-based or learning-based front vehicle detection method.

Meanwhile, such a technology for measuring an inter-vehicle distance is a core technology for autonomous driving of autonomous vehicles, which is being actively discussed in recent years. If the front vehicle is not properly detected during autonomous driving and the inter-vehicle distance is not measured, it may be directly connected to an accident. Therefore, an importance of the technology for measuring an inter-vehicle distance is gradually increasing.

SUMMARY

An object of the present invention is to provide a method, an apparatus, an electronic device, a computer program, and a computer readable recording medium for measuring an inter-vehicle distance based on a vehicle image that tracks a target vehicle through feature point tracking and measures a distance between the target vehicle and an own vehicle, even though the target vehicle may not be detected through a driving image because a lower portion of the target vehicle is not photographed as a distance the own vehicle and the target vehicle (front vehicle or rear vehicle) for distance measurement is closer.

Another object of the present invention is to provide a method, an apparatus, an electronic device, a computer program, and a computer readable recording medium for measuring an inter-vehicle distance based on a vehicle image that provide guidance based on the inter-vehicle distance using a measured distance.

Still another object of the present invention is to provide a method, an apparatus, an electronic device, a computer program, and a computer readable recording medium for measuring an inter-vehicle distance based on a vehicle image that provide an autonomous driving control signal of an own vehicle using a measured distance.

According to an exemplary embodiment of the present invention, a method for measuring an inter-vehicle distance using a processor includes acquiring a driving image photographed by a photographing device of a first vehicle which is being driven; detecting a second vehicle from the acquired driving image; detecting first feature points of a second vehicle region in a first frame corresponding to a frame in which the second frame is detected before a frame in which the second vehicle is not detected among a plurality of frames constituting the driving image, when the second vehicle is not detected from the driving image; detecting second feature points in a second frame corresponding to a current frame by tracking the detected first feature points; calculating a feature point change value between the first feature points and the second feature points; and calculating an inter-vehicle distance from the photographing device of the first vehicle to the second vehicle based on the calculated feature point change value.

In the detecting of the second vehicle, the second vehicle may be detected through a learning model constructed through machine learning or deep learning for a vehicle image.

In the detecting of the first feature points, the detecting of the first feature points of the second vehicle region may be performed when the second vehicle is not detected through the constructed learning model as a distance between the first vehicle and the second vehicle is closer.

In the detecting of the first feature points, a vehicle middle region may be set as a region of interest in the second vehicle region of a frame, and the first feature points may be detected in the set region of interest.

In the detecting of the second feature points, the second feature points in the second frame may be detected by tracking the second feature points using an optical flow of the detected first feature points.

The method may further include filtering second feature points that are not expressed in the second frame when tracking the second feature points using the optical flow, and first feature points corresponding to the second feature points that are not expressed in the second frame.

The calculating of the feature point change value may include: calculating an average pixel position of the first feature points; calculating a first average pixel distance obtained by averaging pixel distances between the calculated average pixel position of the first feature points and the first feature points; calculating an average pixel position of the second feature points; calculating a second average pixel distance obtained by averaging pixel distances between the calculated average pixel position of the second feature points and the second feature points; and calculating an average pixel distance ratio between the first average pixel distance and the second average pixel distance.

The calculating of the inter-vehicle distance may include calculating an image width of the second vehicle in the second frame by multiplying an image width of the second vehicle in the first frame by the calculated average pixel distance ratio.

The calculating of the inter-vehicle distance may further include calculating the inter-vehicle distance from the photographing device of the first vehicle to the second vehicle based on the calculated image width of the second vehicle in the second frame, a focal length of a first photographing device, and a predicted width of the second vehicle.

The calculating of the inter-vehicle distance may further include: calculating an image width ratio between the image width of the detected second vehicle and an image width of a lane on which the second vehicle is located; determining a size class of the second vehicle based on the calculated ratio; and calculating the predicted width of the second vehicle based on the determined size class of the second vehicle.

The method may further include generating guide data for guiding a collision risk level corresponding to a distance difference between the first vehicle and the second vehicle, when the calculated inter-vehicle distance is smaller than a predetermined distance.

The method may further include generating a control signal for controlling autonomous driving of the first vehicle based on the calculated inter-vehicle distance.

According to another exemplary embodiment of the present invention, an apparatus for measuring an inter-vehicle distance includes: an image acquiring unit configured to acquire a driving image photographed by a photographing device of a first vehicle which is being driven; a vehicle detecting unit configured to detect a second vehicle from the acquired driving image; a feature point detecting unit configured to detect first feature points of a second vehicle region in a first frame corresponding to a frame in which the second frame is detected before a frame in which the second vehicle is not detected among a plurality of frames constituting the driving image, when the second vehicle is not detected from the driving image, and detect second feature points in a second frame corresponding to a current frame by tracking the detected first feature points; a feature point change value calculating unit configured to calculate a feature point change value between the first feature points and the second feature points; and an inter-vehicle distance calculating unit configured to calculate a distance from the photographing device of the first vehicle to the second vehicle based on the calculated feature point change value.

The vehicle detecting unit may detect the second vehicle through a learning model constructed through machine learning or deep learning for a vehicle image.

The feature point detecting unit may perform the detecting of the first feature points of the second vehicle region when the second vehicle is not detected through the constructed learning model as a distance between the first vehicle and the second vehicle is closer.

The feature point detecting unit may set a vehicle middle region as a region of interest in the second vehicle region of a frame, and detect the first feature points in the set region of interest.

The feature point detecting unit may detect the second feature points in the second frame by tracking the second feature points using an optical flow of the detected first feature points.

The feature point detecting unit may filter second feature points that are not expressed in the second frame when tracking the second feature points using the optical flow, and first feature points corresponding to the second feature points that are not expressed in the second frame.

The feature point change value calculating unit may include: an average pixel distance calculating unit configured to calculate an average pixel position of the first feature points, calculate a first average pixel distance obtained by averaging pixel distances between the calculated average pixel position of the first feature points and the first feature points, calculate an average pixel position of the second feature points, and calculate a second average pixel distance obtained by averaging pixel distances between the calculated average pixel position of the second feature points and the second feature points; and a ratio calculating unit configured to calculate an average pixel distance ratio between the first average pixel distance and the second average pixel distance.

The inter-vehicle distance calculating unit may calculate an image width of the second vehicle in the second frame by multiplying an image width of the second vehicle in the first frame by the calculated average pixel distance ratio.

The inter-vehicle distance calculating unit may calculate the distance from the photographing device of the first vehicle to the second vehicle based on the calculated image width of the second vehicle in the second frame, a focal length of a first photographing device, and a predicted width of the second vehicle.

The inter-vehicle distance calculating unit may calculate an image width ratio between the image width of the detected second vehicle and an image width of a lane on which the second vehicle is located, determine a size class of the second vehicle based on the calculated ratio, and calculate the predicted width of the second vehicle based on the determined size class of the second vehicle.

The apparatus may further include a guide data generating unit configured to generate guide data for guiding a collision risk level corresponding to a distance difference between the first vehicle and the second vehicle, when the calculated inter-vehicle distance is smaller than a predetermined distance.

The apparatus may further include an autonomous driving control signal generating unit configured to generate a control signal for controlling autonomous driving of the first vehicle based on the calculated inter-vehicle distance.

According to another exemplary embodiment of the present invention, an electronic device providing guidance for assisting a driver based on an inter-vehicle distance, includes: an output unit configured to provide guide information that is identifiable by the driver; an image acquiring unit configured to acquire a driving image photographed by a photographing device; a vehicle detecting unit configured to detect a second vehicle from the acquired driving image; a feature point detecting unit configured to detect first feature points of a second vehicle region in a first frame corresponding to a frame in which the second frame is detected before a frame in which the second vehicle is not detected among a plurality of frames constituting the driving image, when the second vehicle is not detected from the driving image, and detect second feature points in a second frame corresponding to a current frame by tracking the detected first feature points; a feature point change value calculating unit configured to calculate a feature point change value between the first feature points and the second feature points; an inter-vehicle distance calculating unit configured to calculate an inter-vehicle distance from a photographing device of the first vehicle to the second vehicle based on the calculated feature point change value; and a control unit configured to control the output unit to output a front vehicle collision warning or a front vehicle start warning according to the calculated distance.

The output unit may further include a display unit configured to output an augmented reality image by combining the photographed driving image and a guide object, and the control unit may generate a guide object for the front vehicle collision warning, and controls the display unit to superimpose and display the generated guide object for the front vehicle collision warning on a front vehicle display region of the augmented reality image.

According to another exemplary embodiment of the present invention, a computer-readable recording medium on which a program for executing the method for measuring an inter-vehicle distance described above is recorded may be provided.

According to another exemplary embodiment of the present invention, a program for executing the method for measuring an inter-vehicle distance described above may be provided.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
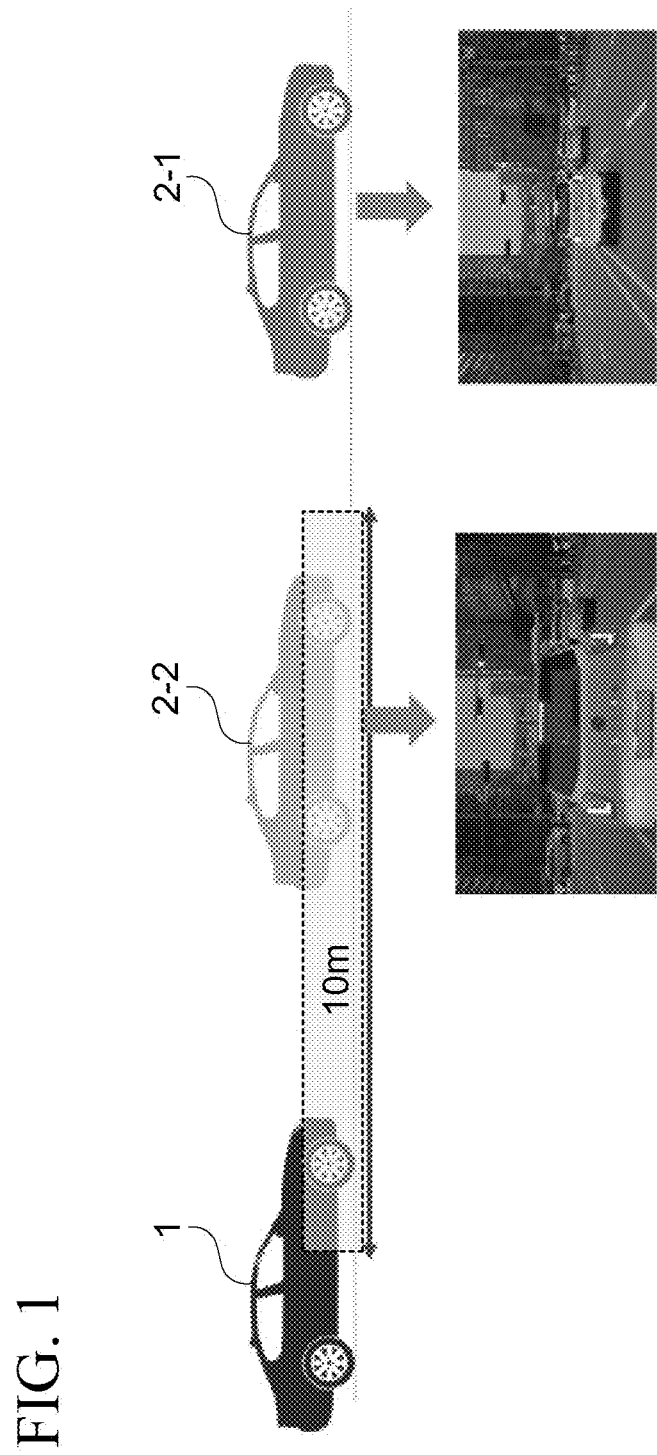
FIG. 1 is a diagram illustrating a driving image photographed according to a distance between an own vehicle and a front vehicle and a problem in the related art.

The following description merely illustrates the principles of the present invention. Therefore, those skilled in the art may implement the principle of the present invention and invent various devices included in the spirit and scope of the present invention, although not clearly described or illustrated in the present specification. In addition, it is to be understood that all conditional terms and exemplary embodiments mentioned in the present specification are obviously intended only to allow those skilled in the art to understand a concept of the present invention in principle, and the present invention is not limited to exemplary embodiments and states particularly mentioned as such.

Further, it is to be understood that all detailed descriptions mentioning specific exemplary embodiments of the present invention as well as principles, aspects, and exemplary embodiments of the present invention are intended to include structural and functional equivalences thereof. Further, it is to be understood that these equivalences include an equivalence that will be developed in the future as well as an equivalence that is currently well-known, that is, all elements invented so as to perform the same function regardless of a structure.

Therefore it is to be understood that, for example, a block diagram of the present specification shows a conceptual aspect of an illustrative circuit for embodying the principle of the present invention. Similarly, it is to be understood that all flowcharts, state transition diagrams, pseudo-codes, and the like, illustrate various processes that may be tangibly embodied in a computer readable medium and that are executed by computers or processors regardless of whether or not the computers or the processors are clearly illustrated.

Functions of various elements including processors or functional blocks represented as concepts similar to the processors and illustrated in the accompanying drawings may be provided using hardware having a capability to execute appropriate software as well as dedicated hardware. When the functions are provided by the processors, they may be provided by a single dedicated processor, a single shared processor, or a plurality of individual processors, and some thereof may be shared with each other.

In addition, terms mentioned as a processor, a control, or a concept similar to the processor or the control should not be interpreted to exclusively cite hardware having the capability to execute software, but should be interpreted to implicitly include digital signal processor (DSP) hardware and a read only memory (ROM), a random access memory (RAM), and a non-volatile memory for storing software without being limited thereto. The above-mentioned terms may also include well-known other hardware.

In the claims of the present specification, components represented as means for performing functions mentioned in a detailed description are intended to include all methods for performing functions including all types of software including, for example, a combination of circuit elements performing these functions, firmware/micro codes, or the like, and are coupled to appropriate circuits for executing the software so as to execute these functions. It is to be understood that since functions provided by variously mentioned means are combined with each other and are combined with a scheme demanded by the claims in the inventions defined by the claims, any means capable of providing these functions are equivalent to means recognized from the present specification.

The above-mentioned objects, features, and advantages will become more obvious from the following detailed description provided in relation to the accompanying drawings. Therefore, those skilled in the art to which the present invention pertains may easily practice a technical idea of the present invention. Further, in describing the present invention, in the case in which it is judged that a detailed description of a well-known technology associated with the present invention may unnecessarily make the gist of the present invention unclear, it will be omitted.

Before describing various exemplary embodiments of the present invention in detail, the names used in the present invention may be defined as follows.

In the present specification, an inter-vehicle distance may refer to a distance in real world coordinates. Here, the inter-vehicle distance may refer to a distance between a first vehicle and a second vehicle, or more precisely, a distance from a photographing device installed in the first vehicle to the second vehicle.

In addition, in the present specification, a width of a vehicle may refer to a width of a vehicle in real world coordinates.

In addition, in the present specification, an image width may refer to a pixel width of an image formed on an imaging surface of an imaging element of a photographing device.

In addition, in the present specification, a pixel distance may refer to a distance between pixels formed on the imaging surface of the imaging element of the photographing device.

Hereinafter, various exemplary embodiments of the present invention will be described in detail with reference to the accompanying drawings.

Figure 2:
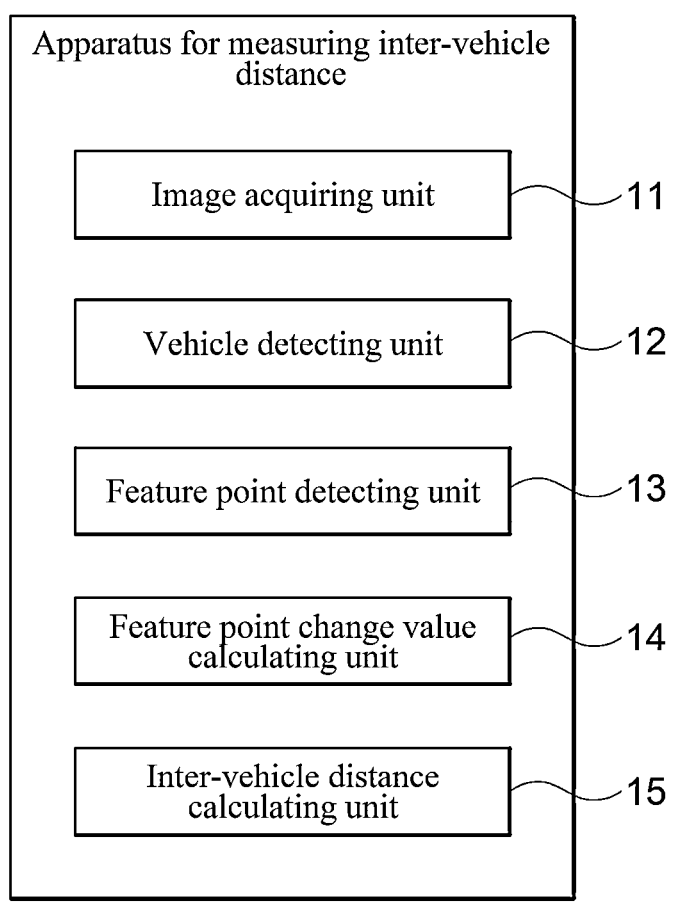
FIG. 2 is a block diagram illustrating an apparatus for measuring an inter-vehicle distance according to an exemplary embodiment of the present invention.
Figure 3:
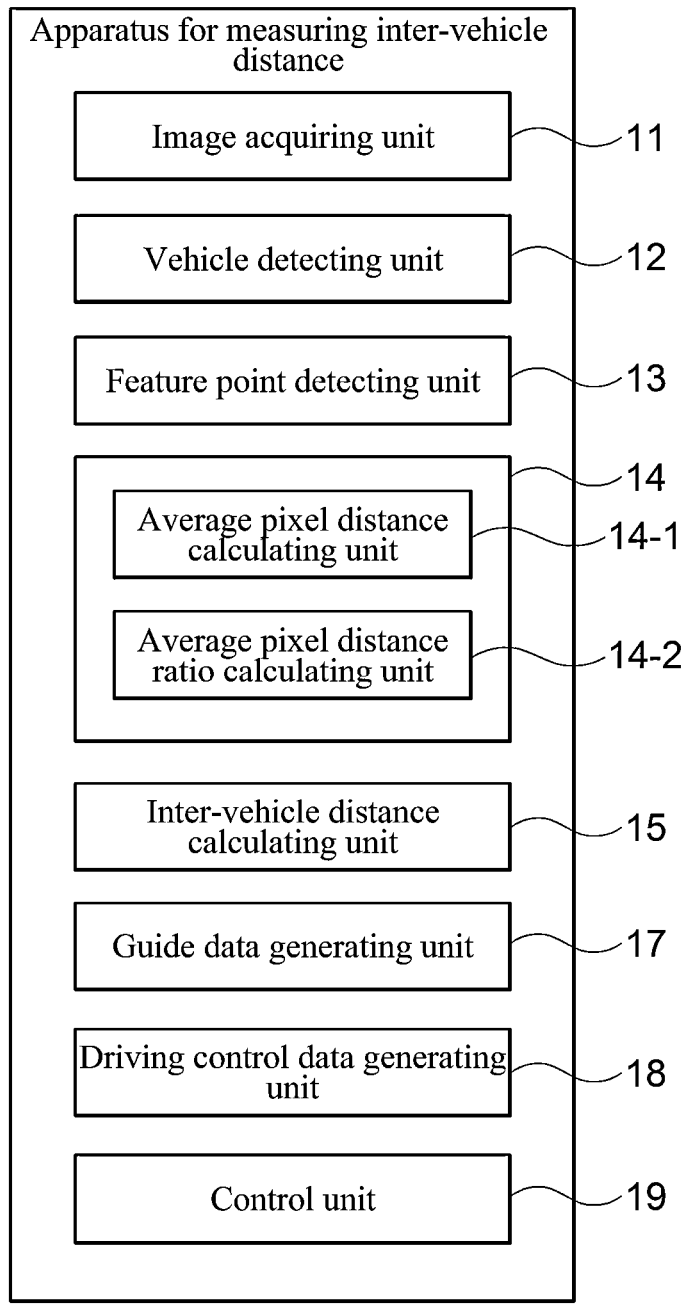
FIG. 3 is a block diagram illustrating in more detail the apparatus for measuring an inter-vehicle distance according to an exemplary embodiment of the present invention.

FIG. 2 is a block diagram illustrating an apparatus for measuring an inter-vehicle distance according to an exemplary embodiment of the present invention. FIG. 3 is a block diagram illustrating in more detail the apparatus for measuring an inter-vehicle distance according to an exemplary embodiment of the present invention. Referring to FIGS. 2 and 3, an apparatus for measuring an inter-vehicle distance may include all or some of an image acquiring unit 11, a vehicle detecting unit 12, a feature point detecting unit 13, a feature point change value calculating unit 14, an inter-vehicle distance calculating unit 15, a guide data generating unit 17, a driving control data generating unit 18, and a control unit 19. In addition, the feature point change value calculating unit 14 may include an average pixel distance calculating unit 14-1 and an average pixel distance ratio calculating unit 14-2.

Here, the apparatus 10 for measuring an inter-vehicle distance may measure a distance between a first vehicle, which is the basis of the distance measurement, and a second vehicle, which is a target of the distance measurement. Here, the first vehicle, which is a vehicle which is the basis of the distance measurement, may alternatively be referred to as a "reference vehicle" or an "own vehicle", and the second vehicle, which is a vehicle which is the target of the distance measurement, may alternatively be referred to as a "target vehicle". In addition, the second vehicle, which is positioned near the first vehicle, may include a front vehicle positioned in front of the first vehicle and a rear vehicle positioned behind the first vehicle.

Such an apparatus 10 for measuring an inter-vehicle distance may calculate a distance between the first vehicle and the second vehicle by controlling an activation of a feature point detection and tracking function according to whether the second vehicle is detected from a driving image photographed by a photographing device of the first vehicle.

Specifically, the first vehicle may be driven on a roadway, and the second vehicle may first appear in front of or behind the first vehicle while the first vehicle is driving. In this case, the apparatus 10 for measuring an inter-vehicle distance may detect the second vehicle from the driving image through a machine learning or deep learning. In addition, the apparatus 10 for measuring an inter-vehicle distance may calculate an inter-vehicle distance between the second vehicle and the first vehicle detected through machine learning or deep learning.

However, in a case in which the second vehicle is not detected from the driving image through machine learning or deep learning because a lower portion of the second vehicle is not photographed as the first vehicle and the second vehicle are close to each other, the apparatus 10 for measuring an inter-vehicle distance may calculate the distance between the first vehicle and the second vehicle by detecting feature points from the driving image and tracking the detected feature points. Specifically, the apparatus 10 for measuring an inter-vehicle distance may select a first frame corresponding to a frame in which the second vehicle is detected before a frame in which the second vehicle is not detected among a plurality of frames constituting the driving image, detect first feature points in a second vehicle region within the selected first frame, detect second feature points in a second frame corresponding to a current frame by tracking the detected first feature points, calculate a feature point change value between the first feature points and the second feature points, and calculate a distance from the photographing device of the first vehicle to the second vehicle based on the calculated feature point change value.

That is, the operation of the apparatus 10 for measuring an inter-vehicle distance according to the present invention will be described in step order. In step 1, the second vehicle may first appear in front of the first vehicle, in step 2, the apparatus 10 for measuring an inter-vehicle distance may detect the second vehicle from the driving image through machine learning or deep learning, and calculate the inter-vehicle distance between the detected second vehicle and the first vehicle, and in step 3, if the second vehicle is not detected from the driving image through machine learning or deep learning, the apparatus 10 for measuring an inter-vehicle distance may calculate the inter-vehicle distance between the second vehicle and the first vehicle by detecting and tracking the feature points from the driving image.

Such an apparatus 10 for measuring an inter-vehicle distance may be implemented using software, hardware, or a combination thereof. As an example, according to a hardware implementation, the apparatus 10 for measuring an inter-vehicle distance may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, micro-processors, and electric units for performing other functions.

Hereinafter, for convenience of explanation, in a case in which the second vehicle to be measured in the distance is the front vehicle, each component module constituting the apparatus 10 for measuring an inter-vehicle distance will be described in more detail.

The image acquiring unit 11 may acquire a driving image photographed by a photographing device of the first vehicle. Specifically, the image acquiring unit 11 may acquire the driving image photographed by the photographing device installed in the first vehicle while driving of the first vehicle in real time. Here, the acquired driving image may include a plurality of lanes distinguished along a lane marking, a road including the plurality of lanes, and a plurality of vehicles driving on the road.

Here, the lane marking may mean each of two lines forming the lane on which the vehicle is located. In addition, the lane may be formed by the lane marking such as a first lane, a second lane, . . . an N lane, and may mean a road on which the vehicle is driven.

The vehicle detecting unit 12 may detect the second vehicle from the driving image acquired by the image acquiring unit 11. Specifically, the vehicle detecting unit 12 may construct a learning model for vehicle detection by performing learning on the vehicle image through machine learning or deep learning, and detect the second vehicle through the constructed learning model. Here, the constructed model is an algorithm or program for detecting the vehicle from the image.

In addition, the learning model for vehicle detection may be learned as a more advanced model using an output value representing a vehicle detection result. As an example, if the output result is an incorrect answer, a user may input a response to the output result, and the vehicle detecting unit 12 may learn the learning model for vehicle detection based on a driver's response.

That is, according to the present invention, the learning model for vehicle detection may be generated by performing machine learning or deep learning, and the vehicle may be detected from the driving image using the generated model. Here, for deep learning, a Convolution Neural Network (CNN) algorithm, which is one of neural network models, may be applied. In this case, deep learning may perform learning through augmented data assuming various conditions of the driving image. Here, the condition defines a condition for transforming the image collected for learning a neural network model. Specifically, since various aspects may be exhibited by factors such as shift, rotation, brightness change, blur, and the like, data may be augmented by taking such aspects into account.

In addition, when a plurality of vehicles are detected from the driving image, the vehicle detecting unit 12 may select the second vehicle, which is the distance measurement target, among the plurality of detected vehicles based on driving state information indicating whether the first vehicle is being accurately driven on a specific lane or is departing from the specific lane.

As an example, when the first vehicle is being driven on the specific lane, the vehicle detecting unit 12 may select the second vehicle located on the same lane as the first vehicle among the plurality of vehicles included in the driving image, and detect the selected second vehicle.

As another example, when the first vehicle is departing from the specific lane, the vehicle detecting unit 12 may select the second vehicle located on a lane to which a front surface of the first vehicle which is departing from the lane is directed, among the plurality of vehicles included in the driving image, and detect the selected second vehicle.

Meanwhile, when the vehicle detecting unit 12 detects the second vehicle, the inter-vehicle distance calculating unit may calculate a distance between the detected second vehicle and the first vehicle. That is, when the vehicle detecting unit 12 detects the second vehicle from the driving image using the learning model, the distance between the detected second vehicle and the first vehicle may be calculated by activating the inter-vehicle distance calculating unit 15 without activating the functions of the feature point detecting unit 13 and the feature point change value calculating unit 14. Here, the inter-vehicle distance calculating unit 15 may calculate the distance between the first vehicle and the detected second vehicle by using an inter-vehicle distance calculation algorithm to be described later.

However, when the vehicle detecting unit 12 does not detect the second vehicle from the driving image through the learning model because a lower portion of the second vehicle is not photographed as the first vehicle and the second vehicle are closer than a predetermined distance, the second vehicle may be tracked through tracking of feature points by activating the functions of the feature point detecting unit 13 and the feature point change value calculating unit 14, and the distance between the first vehicle and the second vehicle may be calculated by activating the inter-vehicle distance calculating unit 15.

This will be described in more detail with reference to FIG. 4.

Figure 4:
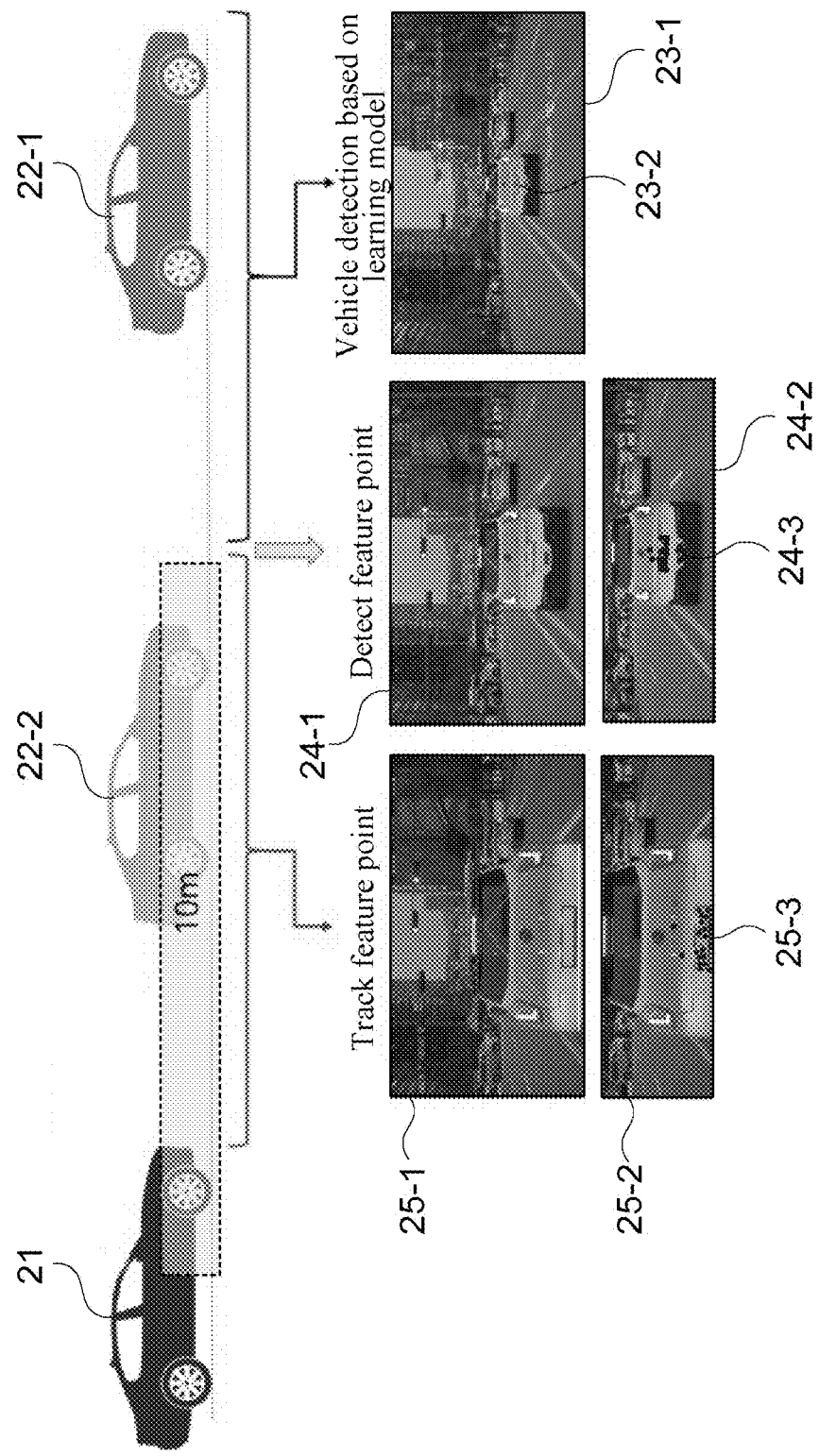
FIG. 4 is a diagram illustrating a process of detecting and tracking a feature point according to an exemplary embodiment of the present invention.

FIG. 4 is a diagram illustrating a process of detecting and tracking a feature point according to an exemplary embodiment of the present invention. Referring to FIG. 4, in a case in which a distance between a first vehicle 21 and a second vehicle 22 is a predetermined distance or more (22-1), since a driving image 23-1 photographed through a photographing device of the first vehicle 21 includes a lower portion of the second vehicle, the vehicle detecting unit 12 may detect a second vehicle image 23-2 from the driving image 23-1 through a learning model constructed through machine learning or deep learning.

At this time, a training dataset required for learning for vehicle detection may be generated by classifying a rear image dataset of the vehicle collected according to the type of vehicle (Sedan, SUV, Truck, Large car, etc.) according to the detection distance (near, medium, and long distance). In addition, the vehicle detecting unit 12 may generate a classifier created by learning the training data using a learning-based method (machine learning, deep learning, etc.). In addition, the vehicle detecting unit 12 may detect the second vehicle image 23-2 from the driving image 23-1 using the generated classifier.

The vehicle detection operation of the vehicle detecting unit 12 will be described in more detail with reference to FIG. 5.

Figure 5:
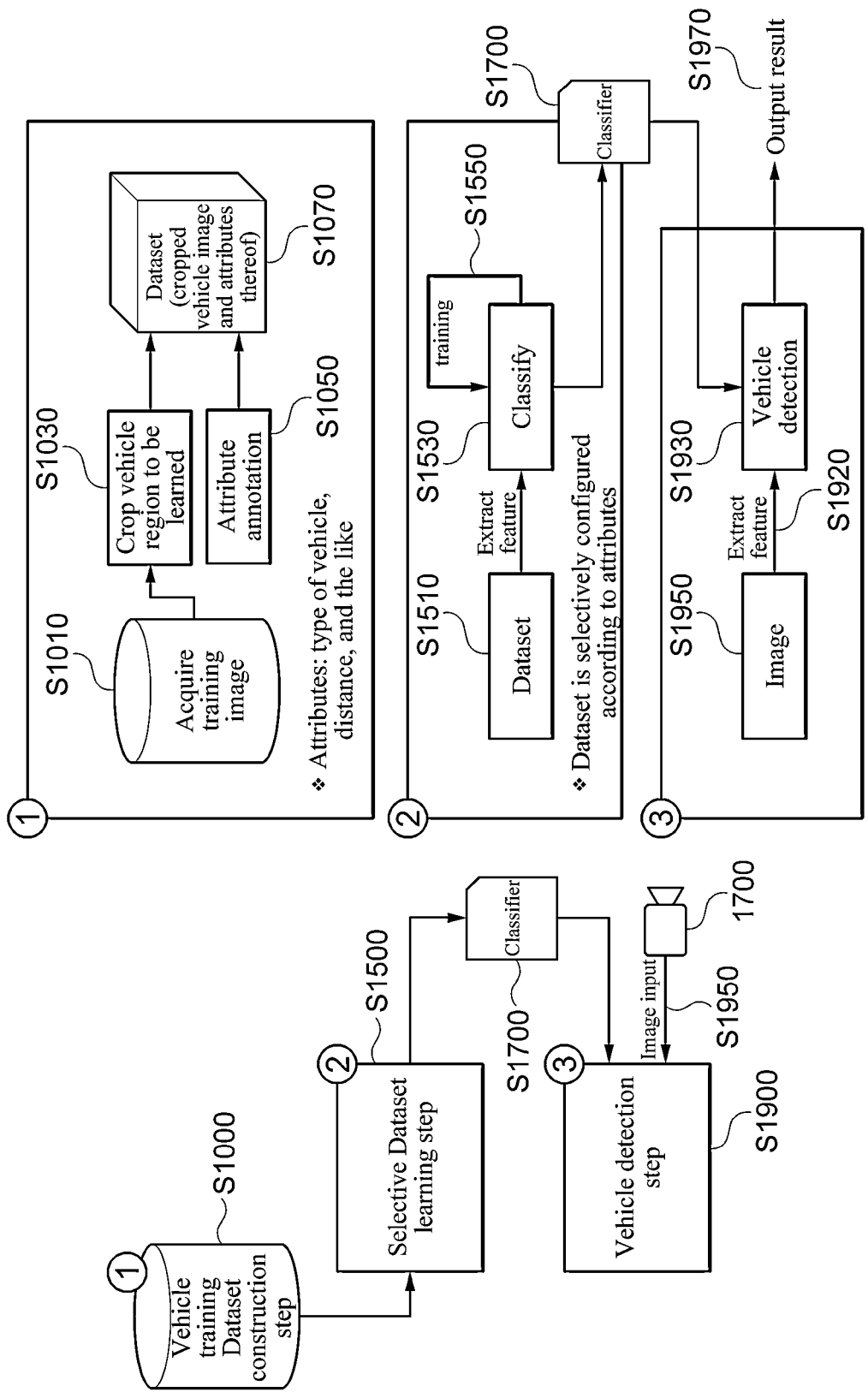
FIG. 5 is a diagram illustrating a process of constructing a training dataset for vehicle detection and detecting a vehicle using the constructed training dataset according to an exemplary embodiment of the present invention.

FIG. 5 is a diagram illustrating a process of constructing a training dataset for vehicle detection and detecting a vehicle using the constructed training dataset.

Referring to FIG. 5, first, a vehicle training dataset may be constructed (S1000), selective data learning (S1500) may be performed using the constructed vehicle training dataset (S1700), and a classifier for vehicle classification may be then generated (S1700). In addition, in a learning system for vehicle detection according to an exemplary embodiment of the present invention, when an image is input through the camera 1700 (S1950), the vehicle may be detected through the generated classifier (S1900).

Specific steps performed for each step may be as shown on the right side of the drawing.

First, the vehicle training dataset construction step (S3000) will be described in detail. The learning system for vehicle detection according to an exemplary embodiment of the present invention may acquire an image to be learned (S1010), may crop a vehicle region to be learned from the learned image (S1030), and may perform an annotation on attributes of a vehicle included in the cropped vehicle region. At this time, the attributes of the vehicle to be annotated may be the type of the vehicle, the distance of the vehicle in the image, and the like. In addition, the learning system for vehicle detection according to an exemplary embodiment of the present invention may generate a training dataset based on the cropped vehicle image and the attributes thereof (S1070).

Specific steps for the selective dataset learning step (S1500) will be described as follows. In addition, the learning system for vehicle detection according to an exemplary embodiment of the present invention may extract features from the constructed dataset (S1510). At this time, as a method of extracting features (i) Grayscale intensity, (ii) Red, Green, Blue (RGB) color information, (iii) Hue, Saturation, Value (HSV) color information, (iv) YIQ color information, (v) Edge information (grayscale, binary, eroded binary), and the like may be used. In addition, the learning system for vehicle detection according to an exemplary embodiment of the present invention may classify the vehicle using the extracted features (S1530), may enhance the process of classifying the vehicle through learning (S1550), and may then generate a classifier for classifying the vehicle (S1700).

Finally, the vehicle detection step (S1900) will be described in detail as follows. The learning system for vehicle detection according to an exemplary embodiment of the present invention may extract features from the image S3950 input through the camera 1700 (S1920), may detect the vehicle by using the classifier for the extracted features (S1930), and may output a detected result (S1970).

Meanwhile, when the vehicle detecting unit 12 detects the second vehicle image 23-2, the inter-vehicle distance calculating unit 15 may calculate a distance between the detected second vehicle 22 and the first vehicle 21.

However, the vehicle encounters various driving environments while driving, and when the distance between the first vehicle 21 and the second vehicle 22 becomes close while the first vehicle 21 is driving (for example, when the distance approaches within 10 m) (22-2), since the driving image photographed through the photographing device of the first vehicle 21 does not include the lower portion of the second vehicle, the vehicle detecting unit 12 may not detect the second vehicle image through the learning model constructed through machine learning or deep learning.

As described above, if the vehicle detecting unit 12 does not detect the second vehicle image from the driving image, the feature point detecting unit 13 may select a first frame 24-1 corresponding to a frame in which the second vehicle is detected before a frame in which the second vehicle is not detected among a plurality of frames constituting the driving image. In addition, the feature point detecting unit 13 may detect feature points using the selected first frame 24-1. In this case, the feature point detecting unit 13 may detect the feature points using the first frame 24-1 that has not been processed as a region of interest, or may detect the feature points using a first frame 24-2 that has been processed as the region of interest. As an example, as illustrated in FIG. 4, the feature point detecting unit 13 may generate the first frame 24-2 that has been processed as the region of interest by setting the second vehicle region as the region of interest in the first frame 24-1, and may detect first feature points 24-3 from the first frame 24-2 that has been processed as the region of interest. In addition, although reference numerals 24-3 of FIG. 4 are described as referring to only one point, the first feature points may refer to all points that are differentiated and displayed in the first frame 24-2 that has been processed as the region of interest. At this time, the feature point detecting unit 13 may set a vehicle middle region as the region of interest in a second vehicle region of the first frame 24-2 that has been processed as the region of interest, and may detect the first feature points 24-3 from the set region of interest Here, the vehicle middle region may include a vehicle license plate region formed on the rear of the vehicle, and may include a vehicle rear bumper region and a trunk region separated by a predetermined distance from the vehicle license plate region.

Here, the feature point detecting unit 13 may detect the first feature points using a Harris corner detection technique or a features-from-accelerated-segment test (FAST) corner detection technique.

Thereafter, the feature point detecting unit 13 may detect second feature points in the second frame corresponding to a current frame by tracking the detected first feature points 24-3. In this case, the feature point detecting unit 13 may detect the feature points using the second frame 25-1 that has not been processed as a region of interest, or may detect the feature points using a second frame 25-2 that has been processed as the region of interest. As an example, as illustrated in FIG. 4, the feature point detecting unit 13 may generate the second frame 25-2 that has been processed as the region of interest by setting the second vehicle region as the region of interest, and may detect second feature points 25-3 from the second frame 25-2 that has been processed as the region of interest. In addition, although reference numerals 25-3 of FIG. 4 are described as referring to only one point, the second feature points may refer to all points that are differentiated and displayed in the second frame 25-2 that has been processed as the region of interest.

At this time, the feature point detecting unit 13 may detect the second feature points 25-3 in the second frame 25-2 that has been processed as the region of interest by tracking the second feature points 25-3 using an optical flow of the detected first points 24-3.

Meanwhile, when tracking the second feature points 25-3 using the optical flow, the feature point detecting unit 13 may filter the second feature points 25-3 that are not expressed in the second frame 25-2 that has been processed as the region of interest, and the first feature points 24-3 corresponding to the second feature points 25-3 that are not expressed in the second frame 25-2 that has been processed as the region of interest. That is, when the distance between the first vehicle 21 and the second vehicle 22 is closer, the second feature points 25-3 corresponding to some (for example, feature points located at the lower portion of the vehicle among the detected first feature points 24-3) of the first feature points 24-3 detected in the first frame 24-2 that has been processed as the region of interest may not be expressed in the second frame 25-2 that has been processed as the region of interest. Accordingly, when tracking the second feature points 25-3 using the optical flow, the feature point detecting unit 13 may filter and remove the second feature points 25-3 that are not expressed in the second frame 25-2 that has been processed as the region of interest, and the first feature points 24-3 corresponding to the second feature points 25-3 that are not expressed in the second frame 25-2 that has been processed as the region of interest, thereby increasing an operation execution speed.

Meanwhile, the feature point change value calculating unit 14 may calculate feature point change values between the first feature points and the second feature points. Here, the feature point change value calculating unit 14 may include an average pixel distance calculating unit 14-1 and an average pixel distance ratio calculating unit 14-2. The operation of the feature point change value calculating unit 14 will be described in more detail with reference to FIG. 6.

Figure 6:
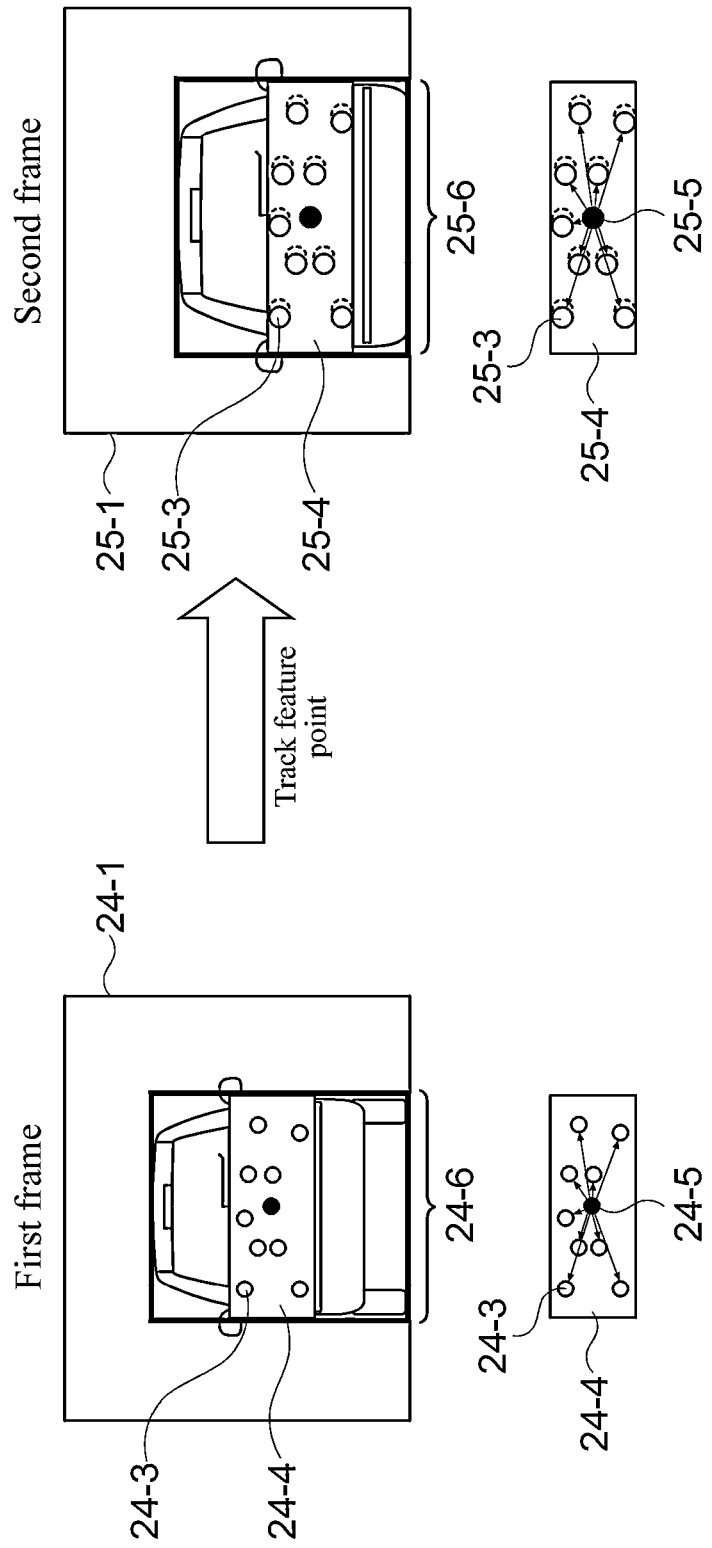
FIG. 6 is a diagram illustrating a feature point change value calculating unit according to an exemplary embodiment of the present invention.

FIG. 6 is a diagram illustrating a feature point change value calculating unit according to an exemplary embodiment of the present invention. Referring to FIG. 6, the average pixel distance calculating unit 14-1 may calculate an average pixel position 24-5 of the first feature points 24-3, and a first average pixel distance obtained by averaging pixel distances between the first feature points 24-3 and the average position. Specifically, the average pixel distance calculating unit 14-1 may calculate a coordinate value of the average pixel position 24-5 by averaging pixel position coordinate values of the first feature points 24-3 in a region of interest 24-4 of the first frame 24-1. Here, the region of interest 24-4 may be a vehicle middle region, and as an example, the region of interest may include a vehicle license plate region formed on the rear of the vehicle, and may include a vehicle rear bumper region and a trunk region separated by a predetermined distance from the vehicle license plate region. In addition, although reference numerals 24-3 of FIG. 6 are described as referring to only one point, the first feature points may refer to all points that are differentiated and displayed in the region of interest 24-4 except for reference numerals 24-5.

In addition, the average pixel distance calculating unit 14-1 may calculate a coordinate value of the average pixel position 24-5 by averaging pixel position coordinate values of the first feature points 24-3 in the region of interest 24-4.

Figure 7:
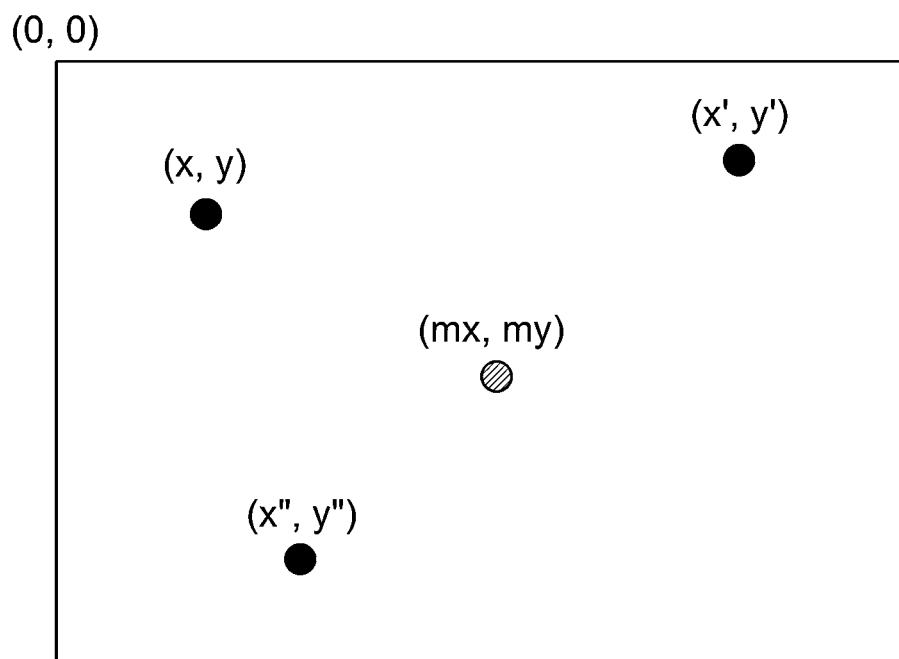
FIG. 7 is a diagram illustrating a method for calculating a feature point average point according to an exemplary embodiment of the present invention.

A process of calculating the average pixel position will be described with reference to FIG. 7. As an example, when the feature points include a first point having (x, y) as the pixel position coordinate value based on a two-dimensional plane coordinate system, a second point having (x', y') as the pixel position coordinate value, and a third point having (x", y") as the pixel position coordinate value, the average pixel distance calculating unit 14-1 may calculate an average pixel position coordinate value (mx, my) by arithmetic average of the pixel position coordinate values of each of the first point, the second point, and the third point.

Meanwhile, referring back to FIG. 6, the average pixel distance calculating unit 14-1 may calculate a first average pixel distance obtained by averaging the pixel distances between the first feature points 24-3 and the calculated average pixel position 24-5. Here, the first frame 24-1 may be a frame corresponding to a frame in which the second vehicle is detected before a frame in which the second vehicle is not detected among the plurality of frames constituting the driving image.

In addition, the average pixel distance calculating unit 14-1 may calculate an average pixel position 25-5 of the second feature points 25-3 tracked using an optical flow, and a second average pixel distance obtained by averaging pixel distances between the second feature points 25-3 and the average position. Specifically, the average pixel distance calculating unit 14-1 may calculate a coordinate value of the average pixel position 25-5 by averaging pixel position coordinate values of the second feature points 25-3 in a region of interest 25-4 of the second frame 25-1. Here, the feature points indicated by dotted lines in FIG. 6 indicate positions of the first feature points 24-3 in the region of interest 24-4 of the first frame 24-1. In addition, the points indicated by solid lines indicate the second feature points 25-3, and although reference numerals 25-3 of FIG. 6 are described as referring to only one point, the second feature points may refer to all points that are differentiated and displayed in the region of interest 25-4 except for reference numerals 25-5.

In addition, the average pixel distance calculating unit 14-1 may calculate a coordinate value of the average pixel position 25-5 by setting the region of interest 25-4 including the second feature points 25-3 and averaging pixel position coordinate values of the feature points 25-3 in the region of interest 25-4. In addition, a second average pixel distance obtained by averaging the pixel distances between each of the feature points 25-3 and the calculated average pixel position 25-5 may be calculated. Here, the second frame 25-1 may be a current frame.

Meanwhile, according to the example described above, an example has been described in which the vehicle middle region is set as the regions of interest 24-4 and 25-4 in the frames 24-1 and 25-1 to perform feature point detection, tracking, and average pixel distance calculation, but the present invention is not limited thereto. According to another exemplary embodiment of the present invention, the entire frames 24-1 and 25-1 may be set as the region of interest, and the above-described feature point detection, tracking, and average distance calculation may also be performed.

Meanwhile, when the first average pixel distance and the second average pixel distance are calculated according to the above-described operation, the average pixel distance ratio calculating unit 14-2 may calculate an average pixel distance ratio between the first average pixel distance and the second average pixel distance. Specifically, the average pixel distance ratio calculating unit 14-2 may calculate an average pixel distance ratio by dividing the second average pixel distance by the first average pixel distance, as illustrated in Equation 1 below.

$$\text{Ratio1} = \frac{curAvgDist}{preAvgDist} \quad \text{[Equation 1]}$$

Here, Ratio 1 may refer to an average pixel distance ratio, curAvgDist may refer to a second average pixel distance, and preAvgDist may refer to a first average pixel distance.

Meanwhile, the inter-vehicle distance calculating unit 15 may calculate an inter-vehicle distance between the first vehicle and the second vehicle. Specifically, the inter-vehicle distance calculating unit 15 may calculate a distance from the photographing device of the first vehicle to the second vehicle based on an image width of the second vehicle, a focal length of the photographing device included in the first vehicle, and a predicted width of the second vehicle. Such an inter-vehicle distance calculating unit 15 will be described in more detail with reference to FIGS. 8 to 12.

Meanwhile, in FIG. 6, it has been described as an example that the feature point change value is calculated using the first frame 24-1 that has not been processed as the region of interest and the second frame 25-1 that has not been processed as the region of interest, but the present invention is not limited thereto. According to another exemplary embodiment of the present invention, the feature point change value may also be calculated using the first frame 24-2 that has been processed as the region of interest and the second frame 25-2 that has been processed as the region of interest.

Figure 8:
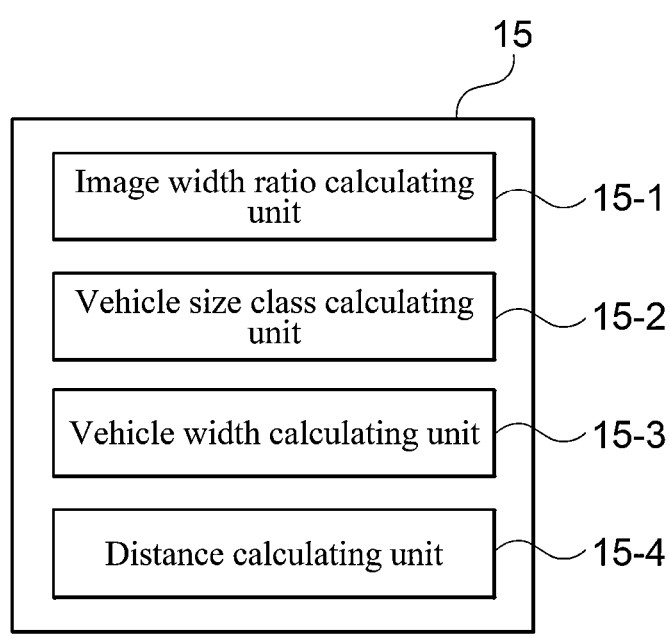
FIG. 8 is a block diagram illustrating in more detail an inter-vehicle distance calculating unit according to an exemplary embodiment of the present invention.
Figure 9:
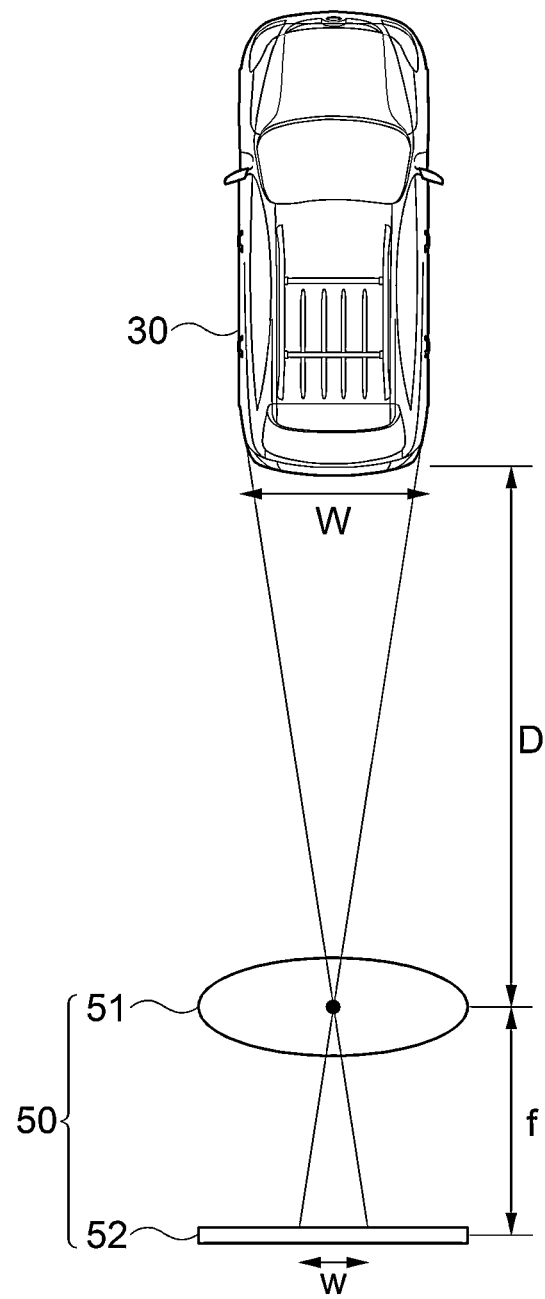
FIG. 9 is a diagram illustrating a method for measuring an inter-vehicle distance according to an exemplary embodiment of the present invention.

FIG. 8 is a block diagram illustrating in more detail an inter-vehicle distance calculating unit 15 according to an exemplary embodiment of the present invention. FIG. 9 is a diagram illustrating a method for measuring an inter-vehicle distance according to an exemplary embodiment of the present invention. Referring to FIGS. 8 and 9, the inter-vehicle distance calculating unit 15 may include an image width ratio calculating unit 15-1, a vehicle size class calculating unit 15-2, a vehicle width calculating unit 15-3, and a distance calculating unit 15-4.

A photographing device 50 for photographing a driving image of a first vehicle (not illustrated) may be installed in the first vehicle. Here, the photographing device 50 may be implemented as a car dash cam or a car video recorder installed in the first vehicle to photograph the surroundings of the vehicle in a situation of driving or parking of the vehicle. Alternatively, the photographing device 50 may also be implemented as a camera formed in a navigation device for performing a route guidance to the driver of the first vehicle or a camera built into a mobile device of the driver.

Such a photographing device 50 may include a lens unit 51 and an imaging element 52, and may further include all or some of a lens unit, a driving unit, an aperture, an aperture driving unit, an imaging element controller, and an image processor, although not illustrated in FIG. 6. Here, the lens unit 51 may perform a function of condensing an optical signal, and the optical signal transmitted through the lens unit 51 reaches an imaging area of the imaging element 52 to form an optical image. Here, as the imaging element 52, a charge coupled device (CCD), a complementary metal oxide semiconductor image sensor (CIS), a high speed image sensor, or the like that converts the optical signal into an electrical signal may be used.

Meanwhile, the inter-vehicle distance calculating unit 15 may calculate a distance between the photographing device 50 installed in the first vehicle and the second vehicle using the driving image photographed by the photographing device 50 of the first vehicle based on Equation 2 below.

$$D = W \times (f \div w) \quad \text{[Equation 2]}$$

Here, D may be the distance from the photographing device installed in the first vehicle to the second vehicle, W may be the width of the second vehicle, f may be the focal length of the photographing device, and w may be the image width of the second vehicle.

That is, the distance D from the photographing device installed in the first vehicle to the second vehicle may refer to a distance from the photographing device installed in the first vehicle to the second vehicle in real-world coordinates.

In addition, the width W of the second vehicle may refer to a width of the second vehicle in real world coordinates.

In addition, the image width may refer to a pixel width of the second vehicle formed on an imaging surface of the imaging element 52 of the photographing device 50. Here, the image width w of the second vehicle may be the same value as VehicleW of Equation 3 to be described later.

Meanwhile, the inter-vehicle distance calculating unit 15 may first calculate a ratio between an image width of the second vehicle 30 and an image width of a lane in which the second vehicle 30 is located from the driving image acquired by the photographing device 50 of the first vehicle, determine a size class of the second vehicle 30 among a plurality of size classes based on the calculated ratio, and calculate the width W of the second vehicle 30 based on the determined size class of the second vehicle. The operation of the inter-vehicle distance calculating unit 15 will be described in more detail with reference to FIG. 10.

Figure 10:
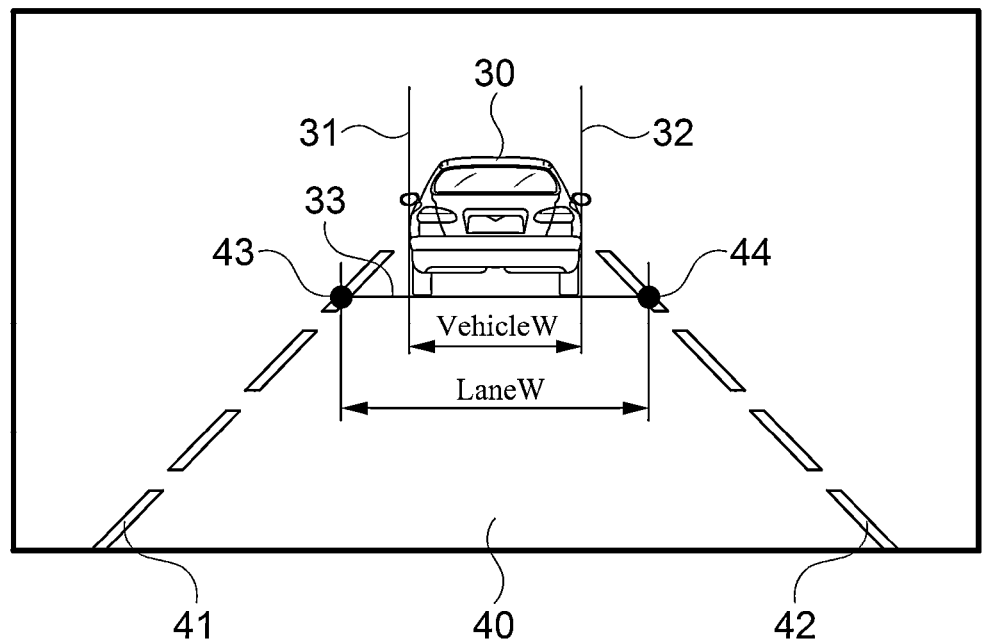
FIG. 10 is a diagram illustrating a ratio between an image width of a second vehicle and an image width of a lane on which the second vehicle is located according to an exemplary embodiment of the present invention.

FIG. 10 is a diagram illustrating a ratio between an image width of a second vehicle and an image width of a lane on which the second vehicle is located according to an exemplary embodiment of the present invention. Referring to FIG. 10, a driving image 45 photographed by the photographing device 50 of the first vehicle may include the second vehicle 30 driving in front of the first vehicle, a lane 40 on which the second vehicle is being driven, and a left marking lane 41 and a right marking lane 42 that separate the lane 40 from other lanes.

In this case, the image width ratio calculating unit 15-1 may calculate an image width VehicleW of the second vehicle 30. Specifically, when the vehicle detecting unit 12 detects the vehicle from the driving image using the pre-constructed learning model, the image width ratio calculating unit 15-1 may identify a left boundary 31 and a right boundary 32 of the second vehicle 30 from the image of the detected second vehicle 30. Such boundary identification will be described in more detail with reference to FIG. 11.

Figure 11:
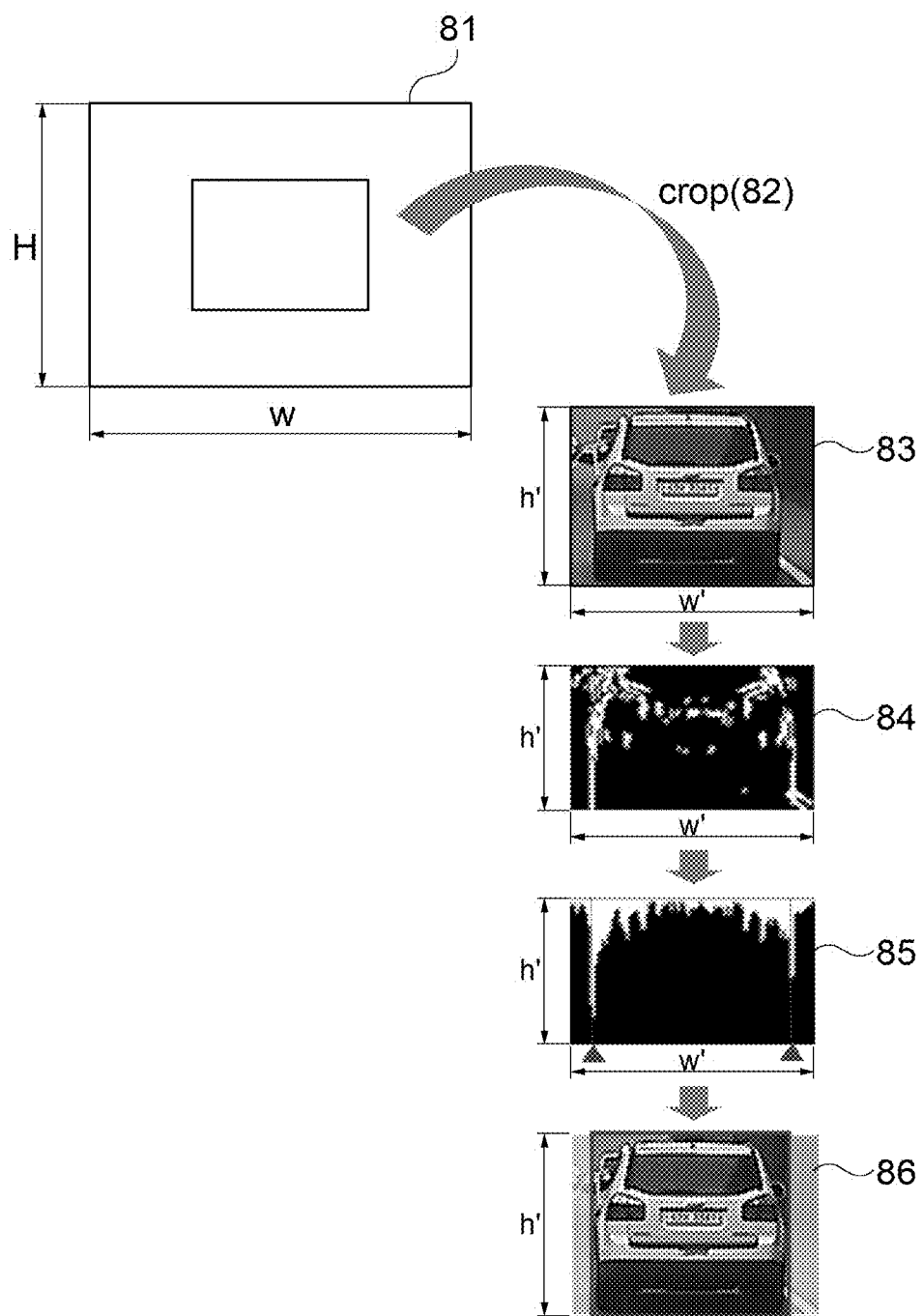
FIG. 11 is a diagram illustrating a process of fitting a region of a vehicle to detected left and right boundary positions of the vehicle according to an exemplary embodiment of the present invention.

Referring to FIG. 11, when the vehicle is detected using the learning model in an image frame (W×H) 81 acquired through the camera, the detected vehicle region may be cropped (82), and a vertical edge may be detected through a Sobel operation on the cropped region (w'×h') 83 (84).

In addition, a vertical histogram accumulation value may be calculated from the detected vertical edge, and a point at which the largest histogram value is located may be detected as left and right boundary positions of the vehicle (85).

In addition, the vehicle region may be fitted to the detected left and right boundary positions of the vehicle (86).

In addition, the image width ratio calculating unit 15-1 may determine an image width between the identified left boundary 31 and the identified right boundary 32 as the image width VehicleW of the second vehicle.

In addition, the image width ratio calculating unit 15-1 may identify the left marking lane 41 and the right marking lane 42 of the lane 40 on which the second vehicle 30 is driving, from the acquired driving image 45. In addition, the image width ratio calculating unit 15-1 may set a line 33 indicating a location of the second vehicle 30 in the lane. Here, the line 33 indicating the location of the second vehicle 30 in the lane may be implemented as a line extending from the lowest end of the second vehicle 30 in the driving image 45. As an example, the line 33 indicating the location of the second vehicle 30 in the lane may be implemented as a line extending from a lower end of the left wheel and a lower end of the right wheel of the second vehicle 30.

Meanwhile, a first point 43 at which the line 33 indicating the second vehicle 30 in the lane and the left marking lane 41 meet, and a second point 44 at which the line 33 indicating the second vehicle 30 in the lane and the right marking lane 42 meet may be determined, and an image width between the first point 43 and the second point 44 may be determined as an image width LaneW of the lane on which the second vehicle 30 is located.

Meanwhile, if the image width VehicleW of the second vehicle and the image width LaneW of the lane on which the second vehicle 30 is located are calculated, the image width ratio calculating unit 15-1 may calculate a ratio between an image width of the second front vehicle and the image width of the lane on which the second vehicle is located by applying Equation 3 below.

$$\text{Ratio2} = (\text{VehicleW}/\text{LaneW}) \times 100 \quad \text{[Equation 3]}$$

Here, VehicleW may refer to the image width of the second vehicle, LaneW may refer to the image width of the lane on which the second vehicle is located, and Ratio 2 may refer to the ratio between the image width of the second vehicle and the image width of the lane on which the second vehicle is located.

As such, when the distance between the first vehicle and the second vehicle is closer, the image width of the second vehicle and the image width of the lane on which the second vehicle is located may become larger, and when the distance between the first vehicle and the second vehicle increases, the image width of the second vehicle and the image width of the lane on which the second vehicle is located may become smaller. However, since the ratio described above is proportional to the size of the second vehicle without affecting the distance between the first vehicle and the second vehicle, the ratio described above may be used as an index for calculating the size of the second vehicle according to the present invention.

Meanwhile, according to the above example, if the ratio between the image width of the second vehicle and the image width of the lane in which the second vehicle is located is calculated, the inter-vehicle distance calculating unit 15 may determine the size class of the second vehicle among the plurality of size classes. This will be described in more detail with reference to FIG. 12.

Figure 12:
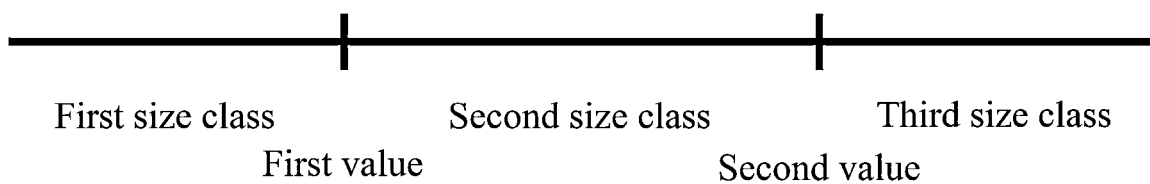
FIG. 12 is a conceptual diagram illustrating a process of determining a size class of a second vehicle according to an exemplary embodiment of the invention.

FIG. 12 is a conceptual diagram illustrating a process of determining a size class of a second vehicle according to an exemplary embodiment of the invention. Referring to FIG. 12, the vehicle size class calculating unit 15-2 may classify a ratio value into a plurality of sections, and may calculate a size class of the vehicle based on a threshold value table that matches the size class of the second vehicle to each of the plurality of sections.

As an example, the threshold value table may be classified into three sections based on a first value and a second value. When the calculated ratio is smaller than the first value, the vehicle may match the first size class corresponding to a compact car, when the calculated ratio is greater than the first value and smaller than the second value, the vehicle may match the second size class corresponding to a midsize car, and when the calculated ratio is greater than the second value, the vehicle may match the third size class corresponding to a full-sized car.

In this case, if the ratio calculated by the image width ratio calculating unit 15-1 is smaller than the first value, the vehicle size class calculating unit 15-2 may determine the size class of the second vehicle as the first size class. In addition, if the ratio calculated by the image width ratio calculating unit 15-1 is greater than the first value and smaller than the second value, the vehicle size class calculating unit 15-2 may determine the size class of the second vehicle as the second size class. In addition, if the ratio calculated by the ratio calculating unit 15-1 is greater than the second value, the vehicle size class calculating unit 15-2 may determine the size class of the second vehicle as the third size class. As an example, the first value may be 48% and the second value may be 60%.

The vehicle width calculating unit 15-3 may determine a width of the second vehicle based on the size class of the second vehicle. Specifically, the storing unit may store the vehicle width for each of the plurality of size classes as in Table 1 below, and in this case, the vehicle width calculating unit 15-3 may determine the width VehicleW of the second vehicle by detecting a vehicle width corresponding to the determined size class among the vehicle widths pre-stored in the storing unit.

TABLE 1

|  | First Size Class | Second Size Class | Third Size Class |
|---|---|---|---|
| Actual Width Of Vehicle | 1,500 mm | 1,900 mm | 2,500 mm |

In addition, the distance calculating unit 15-4 may calculate the distance between the photographing device 50 and the second vehicle 30 by dividing the focal length f of the photographing device 50 by the image width w of the second vehicle 30 and multiplying the width W of the second vehicle calculated by the vehicle width calculating unit 15-3 as in Equation 2 described above.

Meanwhile, if the distance between the photographing device 50 and the second vehicle 30 is calculated, the distance calculating unit 15-4 may calculate a distance value between the first vehicle in which the photographing device 50 is installed and the second vehicle 30 by appropriately correcting a distance value between the photographing device 50 and the second vehicle 30 in order to accurately calculate the inter-vehicle distance. According to the present invention described above, it is possible to more accurately measure the inter-vehicle distance by reducing an error in the inter-vehicle distance between the first vehicle and the second vehicle.

That is, in order to calculate the same distance value calculated based on Equation 2 above for each of the compact car, the midsize car, and the full-sized car with different widths located at the same distance from the first vehicle, it is necessary to know the width of each vehicle. However, in the conventional image recognition and detection, it is impossible to check all the specifications according to all vehicle types, and therefore, since the inter-vehicle distance is conventionally measured by treating a vehicle width with a predetermined specific constant value without considering an actual vehicle width of a large number of vehicles having different widths (e.g., compact cars, midsize cars, and full-sized cars), there is a problem that the measured inter-vehicle distance value is not accurate.

However, according to the present invention, in order to solve such a problem, the front vehicle is classified into the compact car, the midsize car, and the full-sized car using the ratio between the image width of the front vehicle and the image width of the lane, and the inter-vehicle distance is measured based on an average width assigned to each of the compact car, the midsize car, and the full-sized car based on the classified result, thereby making it possible to reduce the error and more accurately measure the inter-vehicle distance.

Meanwhile, if the predicted vehicle width of the second vehicle is calculated as described above, the distance between the photographing device of the first vehicle and the second vehicle may be calculated by continuously measuring the image width of the second vehicle in an environment where the vehicle detecting unit 12 detects the second vehicle.

However, when the vehicle detecting unit 12 does not detect the second vehicle from the driving image through the learning model because the lower portion of the second vehicle is not photographed as the distance between the first vehicle and the second vehicle is less than a predetermined distance, the image width of the second vehicle may not be measured.

Accordingly, according to the present invention, when the vehicle detecting unit 12 does not detect the second vehicle from the driving image through the learning model because the lower portion of the second vehicle is not photographed as the distance between the first vehicle and the second vehicle is less than the predetermined distance, the image width of the second vehicle may be predicted based on the average distance ratio calculated by the average distance ratio calculating unit 14-2. This will be described in detail with reference to FIG. 6 again.

Referring to FIG. 6 described above, the first frame 24-1 is a frame corresponding to a frame in which the second vehicle is detected before a frame in which the second vehicle is not detected among the plurality of frames constituting the driving image, and the vehicle detecting unit 12 may detect the second vehicle 30 in the first frame 24-1, and the image width ratio calculating unit 15-1 may calculate the image width 24-6 of the second vehicle.

However, since the second frame 25-1 is a current frame and a frame in which the second vehicle is not detected, the image width ratio calculating unit 15-1 may calculate a predicted value of the image width of the second vehicle in the second frame 25-1 by applying the image width 24-6 of the second vehicle and the average pixel distance ratio calculated by the average pixel distance ratio calculating unit 14-2 to Equation 4 below.

$$\text{curVehicleW} = \text{Ratio1} \times \text{preVehicleW} \quad \text{[Equation 4]}$$

Here, curVehicleW may refer to the image width of the second vehicle in the second frame 25-1, Ratio 1 may refer to the average pixel distance ratio calculated according to Equation 1, and preVehicleW may refer to the image width of the second vehicle in the first frame 24-1.

In addition, the distance calculating unit 15-4 may calculate the distance between the photographing device 50 and the second vehicle 30 by dividing the focal length f of the photographing device 50 by the image width curVehicleW of the second vehicle in the second frame 25-1 and multiplying the width W of the second vehicle 30 calculated by the vehicle width calculating unit 15-3 as in Equation 2 described above.

Accordingly, according to the present invention, even though the target vehicle may not be detected through the driving image because the lower portion of the second vehicle is not photographed as the distance the first vehicle and the second vehicle is closer, the distance between the own vehicle and the target vehicle may be accurately measured through the feature point tracking.

In addition, according to another exemplary embodiment of the present invention, the inter-vehicle distance calculating unit 15 may monitor the distance between the second vehicle and the first vehicle by calculating a ratio between the image width w 24-6 of the second vehicle detected from the first frame 24-1 and the image width w 25-6 of the second vehicle detected from the second frame 25-1. The control unit 19 may provide the driver with various functions related to driving of the vehicle, such as collision notification and adaptive cruise control, using the distance monitored by the inter-vehicle distance calculating unit 15.

Meanwhile, if the distance calculated by the inter-vehicle distance calculating unit 13-4 is smaller than a predetermined distance, the guide data generating unit 17 may generate data for guiding a collision risk level corresponding to the distance difference between the first vehicle and the second vehicle.

In addition, the driving control data generating unit 18 may generate a control signal for controlling autonomous driving of the first vehicle based on the distance calculated by the inter-vehicle distance calculating unit 15.

The operation of the guide data generating unit 17 and the driving control data generating unit 18 will be described later based on the control unit 19.

The control unit 19 controls an overall operation of the apparatus 10 for measuring an inter-vehicle distance. Specifically, the control unit 19 may control all or some of the image acquiring unit 11, the vehicle detecting unit 12, the feature point detecting unit 13, the feature point change value calculating unit 14, the inter-vehicle distance calculating unit 15, the guide data generating unit 17, and the driving control data generating unit 18.

In particular, the control unit 19 may control the vehicle detecting unit 12 to detect the second vehicle from the driving image photographed by the photographing device of the first vehicle which is being driven, select a first frame corresponding to a frame in which the second vehicle is detected before a frame in which the second vehicle is not detected among the plurality of frames constituting the driving image when the second vehicle is not detected from the driving image, detect first feature points in the second vehicle region in the selected first frame, control the feature point detecting unit 13 to detect second feature points in the second frame corresponding to the current frame by tracking the detected first feature points, control the feature point change value calculating unit 14 to calculate a feature point change value between the first feature points and the second feature points, and control the inter-vehicle distance calculating unit 15 to calculate the distance from the photographing device of the first vehicle to the second vehicle based on the calculated feature point change value.

In addition, if inter-vehicle distance information between the first vehicle and the second vehicle is acquired, the control unit 19 may control the guide data generating unit 17 to generate guide data for assisting safe driving of a driver of the first vehicle based on the acquired inter-vehicle distance information. Specifically, if the inter-vehicle distance calculated by the inter-vehicle distance calculating unit 15 is smaller than the determined distance, the guide data generating unit 17 may generate guide data for guiding a distance difference between the first vehicle and the second vehicle. As an example, the guide data generated by the guide data generating unit 17 may be data for warning by voice or guiding by an image that the inter-vehicle distance needs to pay attention.

As another example, if the inter-vehicle distance calculated by the inter-vehicle distance calculating unit 15 is smaller than the predetermined distance, the guide data generating unit 17 may generate data for guiding a collision risk level corresponding to the distance difference between the first vehicle and the second vehicle. As an example, when the distance difference between the first vehicle and the second vehicle is divided into a plurality of levels, the guide data generating unit 17 may generate data for guiding a first risk level when the inter-vehicle distance is smaller than a first value, may generate data for guiding a second risk level having the degree of risk higher than the first risk level when the inter-vehicle distance is greater than the first value and smaller than a second value, and may generate data for guiding a third risk level having the degree of risk higher than the second risk level when the inter-vehicle distance is greater than the second value.

Meanwhile, if the inter-vehicle distance information between the first vehicle and the second vehicle is acquired, the control unit 19 may control the driving control data generating unit 18 to generate driving control data for controlling autonomous driving of the first vehicle based on the acquired inter-vehicle distance information. Specifically, when the first vehicle is operating in an autonomous driving mode and the inter-vehicle distance calculated by the inter-vehicle distance calculating unit 15 is smaller than the predetermined value, the control unit 19 may control the driving control data generating unit 18 to generate the driving control data for controlling the autonomous driving of the first vehicle (e.g., command data to control a speed of the first vehicle to decrease from a current speed to a predetermined speed or to stop the first vehicle). Here, the driving control data generated by the driving control data generating unit 18 may be transmitted to an autonomous driving control unit which collectively controls the autonomous driving of the first vehicle, and the autonomous driving control unit of the first vehicle may control the first vehicle to be autonomously driven by controlling various units (brake, steering wheel, electric motor, engine, etc.) included in the first vehicle based on such transmitted information.

Hereinafter, a method for measuring an inter-vehicle distance according to an exemplary embodiment of the present invention will be described in more detail with reference to FIGS. 13 to 16.

Figure 13:
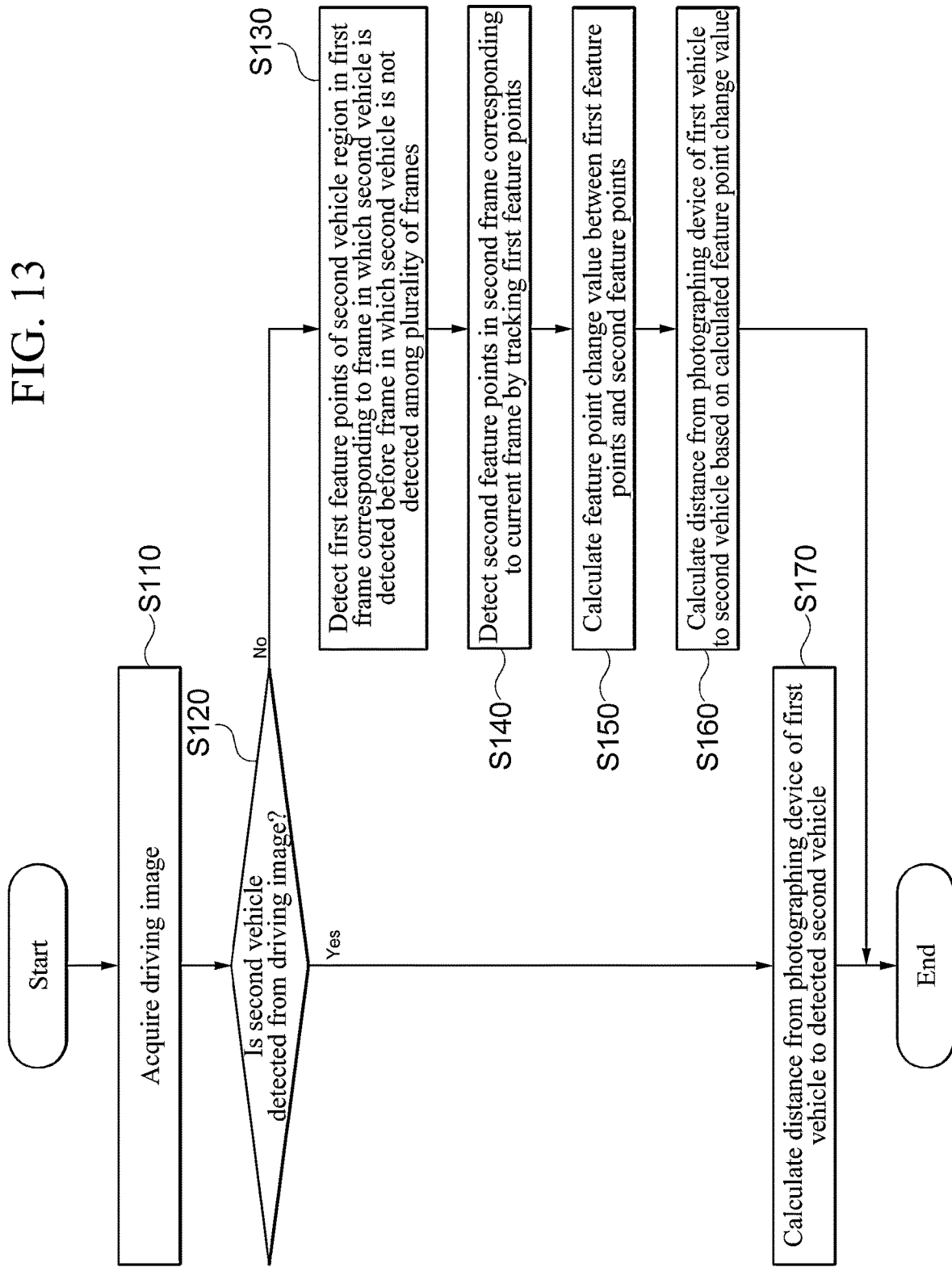
FIG. 13 is a flowchart illustrating a method for measuring an inter-vehicle distance according to an exemplary embodiment of the present invention.

FIG. 13 is a flowchart illustrating a method for measuring an inter-vehicle distance according to an exemplary embodiment of the present invention. Referring to FIG. 13, first, a driving image photographed by the photographing device of the first vehicle which is being driven may be first acquired (S110).

In addition, it may be determined whether the second vehicle is detected from the acquired driving image (S120). Here, the detection of the second vehicle from the acquired driving image may be performed through a learning model constructed through machine learning or deep learning for the vehicle image.

If the second vehicle is detected from the acquired driving image (S120: Y), the distance to the detected second vehicle from the photographing device of the first vehicle may be calculated (S170). Here, in the distance calculation step (S170), an image width ratio between the detected image width of the second vehicle and the image width of the lane may be calculated, a size class of the second vehicle may be determined based on the calculated image width ratio, a predicted width of the second vehicle may be calculated based on the determined size class of the second vehicle, and the distance to the second vehicle from the photographing device of the first vehicle may be calculated by applying the image width of the second vehicle, the focal distance of the first photographing device, and the predicted width of the second vehicle to Equation 2 described above.

However, if the second vehicle is not detected from the acquired driving image (S120: N), a first frame corresponding to a frame in which the second vehicle is detected before a frame in which the second vehicle is not detected among a plurality of frames constituting the driving image may be selected, and the first feature points may be detected in the second vehicle region in the selected first frame (S130). That is, in the step (S130) of detecting the first feature points, if the second vehicle is not detected through the constructed learning model as the distance between the first vehicle and the second vehicle is closer, a step of detecting first feature points of the second vehicle region may be performed. In the step (S130) of detecting the first feature points, the vehicle middle region may be set as the region of interest in the second vehicle area of the first frame, and first feature points may be detected in the set region of interest.

In addition, the second feature points in the second frame corresponding to the current frame may be detected by tracking the detected first feature points (S140). Specifically, in the step (S140) of detecting the second feature points, the second feature points in the second frame may be detected by tracking the second feature points using an optical flow of the detected first feature points.

In addition, according to an exemplary embodiment of the present invention, the method for measuring an inter-vehicle distance may further include a step of filtering second feature points that are not expressed in the second frame when tracking the second feature points using the optical flow, and first feature points corresponding to the second feature points that are not expressed in the second frame.

In addition, a feature point change value between the first feature points and the second feature points may be calculated (S150). Here, the step (S150) of calculating the feature point change value will be described later with reference to FIG. 14.

In addition, a distance from the photographing device of the first vehicle to the second vehicle may be calculated based on the calculated feature point change value (S160). Here, the step (S160) of calculating the distance will be described in more detail with reference to FIG. 15.

Figure 14:
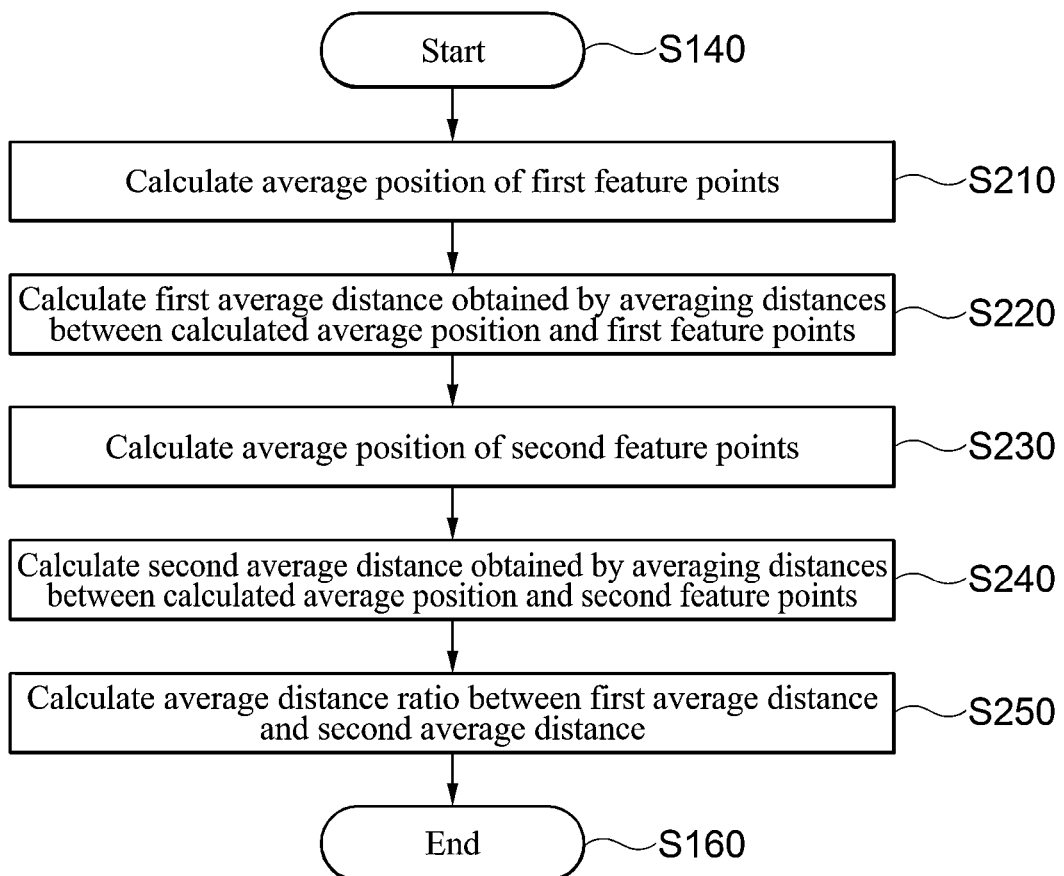
FIG. 14 is a flowchart illustrating in more detail a step (S150) of calculating a feature point change value according to an exemplary embodiment of the present invention.

FIG. 14 is a flowchart illustrating in more detail a step (S150) of calculating a feature point change value according to an exemplary embodiment of the present invention. Referring to FIG. 14, an average pixel position of the first feature points may be calculated (S210). In addition, a first average pixel distance obtained by averaging the pixel distances between the first feature points and the calculated average pixel position may be calculated (S220). Specifically, the average pixel distance calculating unit 14-1 may calculate a coordinate value of the average pixel position by averaging pixel position coordinate values of the first feature points, and may calculate a first average pixel distance obtained by averaging pixel distances between the calculated average pixel positions and the first feature points. Here, the first frame may be a frame corresponding to a frame in which the second vehicle is detected before a frame in which the second vehicle is not detected among the plurality of frames constituting the driving image, and may be a frame before the second frame.

In addition, an average pixel position of the second feature points may be calculated (S230). In addition, a second average pixel distance obtained by averaging the distances between the second feature points and the calculated average pixel position may be calculated (S240). Specifically, the average pixel distance calculating unit 14-1 may calculate a coordinate value of the average pixel position by averaging pixel position coordinate values of the second feature points, and may calculate a first average pixel distance obtained by averaging pixel distances between the calculated average pixel positions and the second feature points. Here, the second frame may be a frame after the first frame.

In addition, an average pixel distance ratio between the first average pixel distance and the second average pixel distance may be calculated (S250). Specifically, the average pixel distance ratio calculating unit 14-2 may calculate an average pixel distance ratio by dividing the second average pixel distance by the first average pixel distance, as illustrated in Equation 1 described above.

Figure 15:
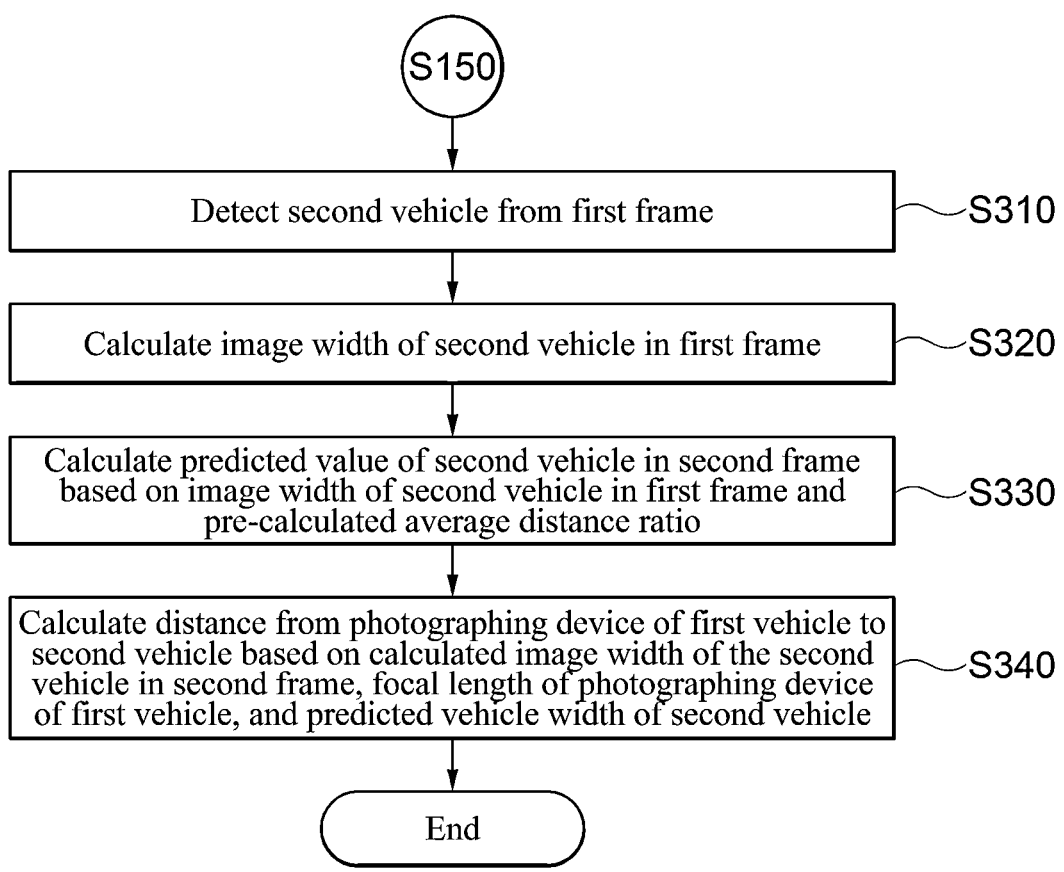
FIG. 15 is a flowchart illustrating in more detail a step (S160) of calculating an inter-vehicle distance according to an exemplary embodiment of the present invention.
Figure 16:
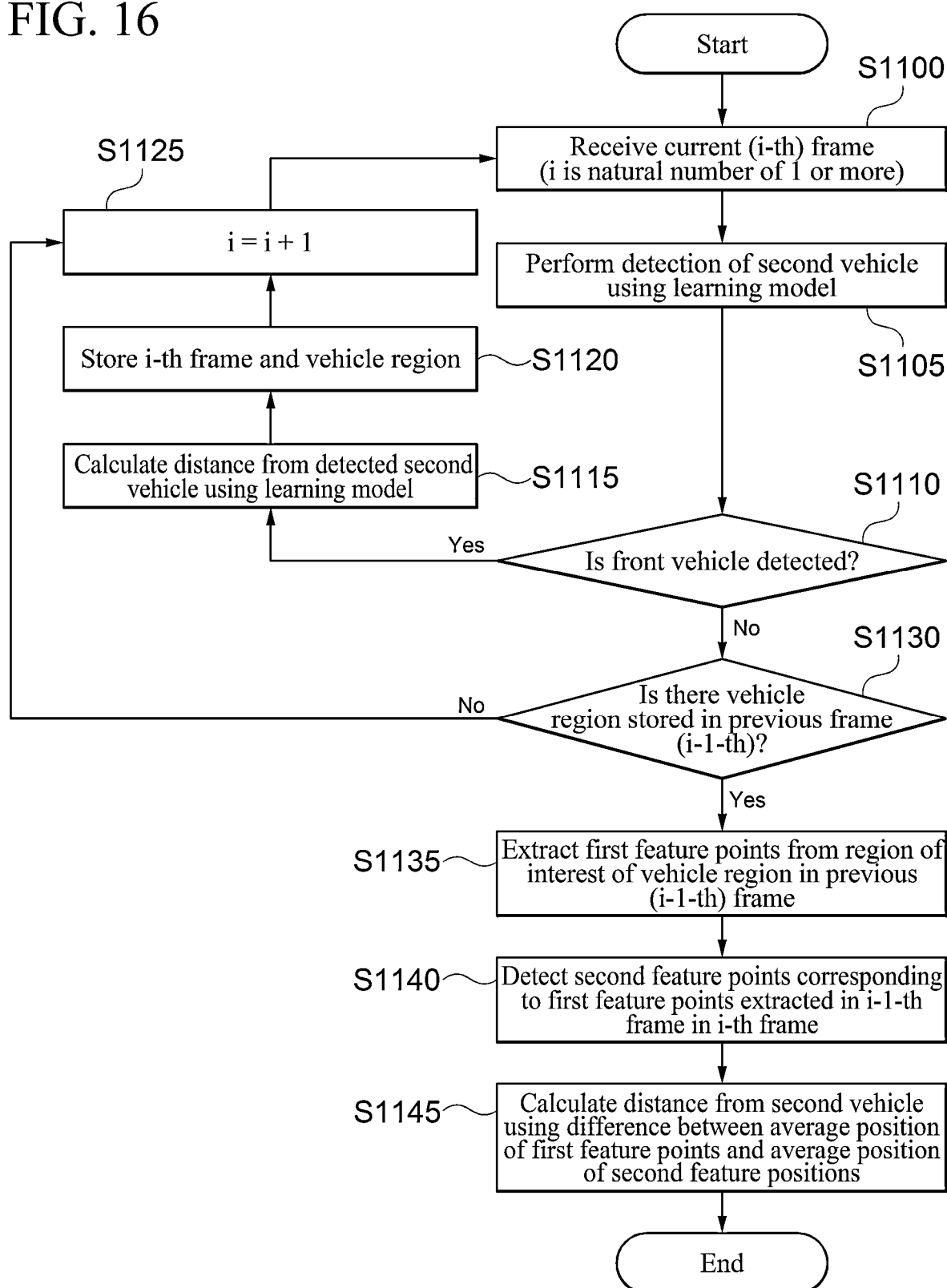
FIG. 16 is a flowchart illustrating a method for measuring an inter-vehicle distance according to another exemplary embodiment of the present invention.

FIG. 15 is a flowchart illustrating in more detail the step (S160) of calculating an inter-vehicle distance according to an exemplary embodiment of the present invention. Referring to FIG. 16, the second vehicle may be detected from the first frame (S310), and the image width of the second vehicle may be calculated in the first frame (S320).

In addition, a predicted value of the image width of the second vehicle in the second frame may be calculated based on the image width of the second vehicle in the first frame and the average pixel distance ratio calculated by the average pixel distance ratio calculating unit (S330). That is, since the second frame is a frame in which the second vehicle is not detected, the image width ratio calculating unit 15-1 may calculate the predicted value of the image width of the second vehicle in the second frame by applying the image width of the second vehicle and the average pixel distance ratio calculated by the average pixel distance ratio calculating unit 14-2 to Equation 4 described above.

In addition, a distance from the photographing device of the first vehicle to the second vehicle may be calculated based on the calculated image width of the second vehicle in the second frame, a focal length of the photographing device of the first vehicle, and the predicted width of the second vehicle (S340). Specifically, the distance calculating unit 15-4 may calculate the distance between the photographing device of the first vehicle and the second vehicle by dividing the focal length f of the photographing device of the first vehicle by the image width curVehicleW of the second vehicle in the second frame and multiplying the predicted width of the second vehicle calculated by the vehicle width calculating unit 15-3 as in Equation 2 described above.

Here, the process of calculating the predicted width of the second vehicle may include a step of calculating an image width ratio between the image width of the second vehicle detected by the vehicle detecting unit 12 and the image width of the lane on which the second vehicle is located, a step of determining a size class of the second vehicle based on the calculated ratio, and a step of calculating the predicted width of the second vehicle based on the determined size class of the second vehicle. The predicted width of the second vehicle may be calculated and stored in advance while the second vehicle is detected by the vehicle detecting unit 12.

FIG. 16 is a flowchart illustrating a method for measuring an inter-vehicle distance according to another exemplary embodiment of the present invention.

Referring to FIG. 16, first, the apparatus 10 for measuring an inter-vehicle distance receives a current frame (i-th frame) through the image acquiring unit 11 (S1100). In addition, the apparatus 10 for measuring an inter-vehicle distance performs a second vehicle detection using the learning model in the received i-th frame (S1105), calculates from the detected second vehicle using the learning model (S1115) if the second vehicle exists in the i-th frame (S1110: Y), and then stores the i-th frame and a detected vehicle region (S1120). At this time, the detected vehicle region may be set in a rectangular shape, a circular shape, or a polygonal shape, but is not limited thereto.

In addition, if the i-th frame and the vehicle region are stored, the apparatus 10 for measuring an inter-vehicle distance updates i to i+1 (S1125), and receives an i+1-th frame as the current frame (S1100).

However, in S1110, if the second vehicle is not detected (S1110: N), the apparatus 10 for measuring an inter-vehicle distance checks whether the vehicle region stored in the immediately previous frame (i−1-th frame) exists (S1130). In addition, in S1130, if the vehicle region stored in the i−1-th frame exists (S1130: Y), the apparatus 10 for measuring an inter-vehicle distance extracts first feature points from a region of interest of the vehicle region in the i−1-th frame (S1135), extracts second feature points corresponding to the first feature points extracted in the i−1-th frame in the i-th frame (S1140), and then calculates the distance from the second vehicle using an average pixel position of the first feature points and an average pixel position of the second feature points (S1145).

On the other hand, in S1130, if there is no vehicle region stored in the i−1-th frame (S1130: N), the apparatus 10 for measuring an inter-vehicle distance determines that the second vehicle has not existed before and receives a new current frame obtained from the image acquiring unit 11 (S1125).

Meanwhile, the apparatus 10 for measuring an inter-vehicle distance may be implemented as one module of an electronic device that outputs various guide information for assisting a driver's driving to perform a route guidance function. This will be described in more detail with reference to FIGS. 15 to 17.

Figure 17:
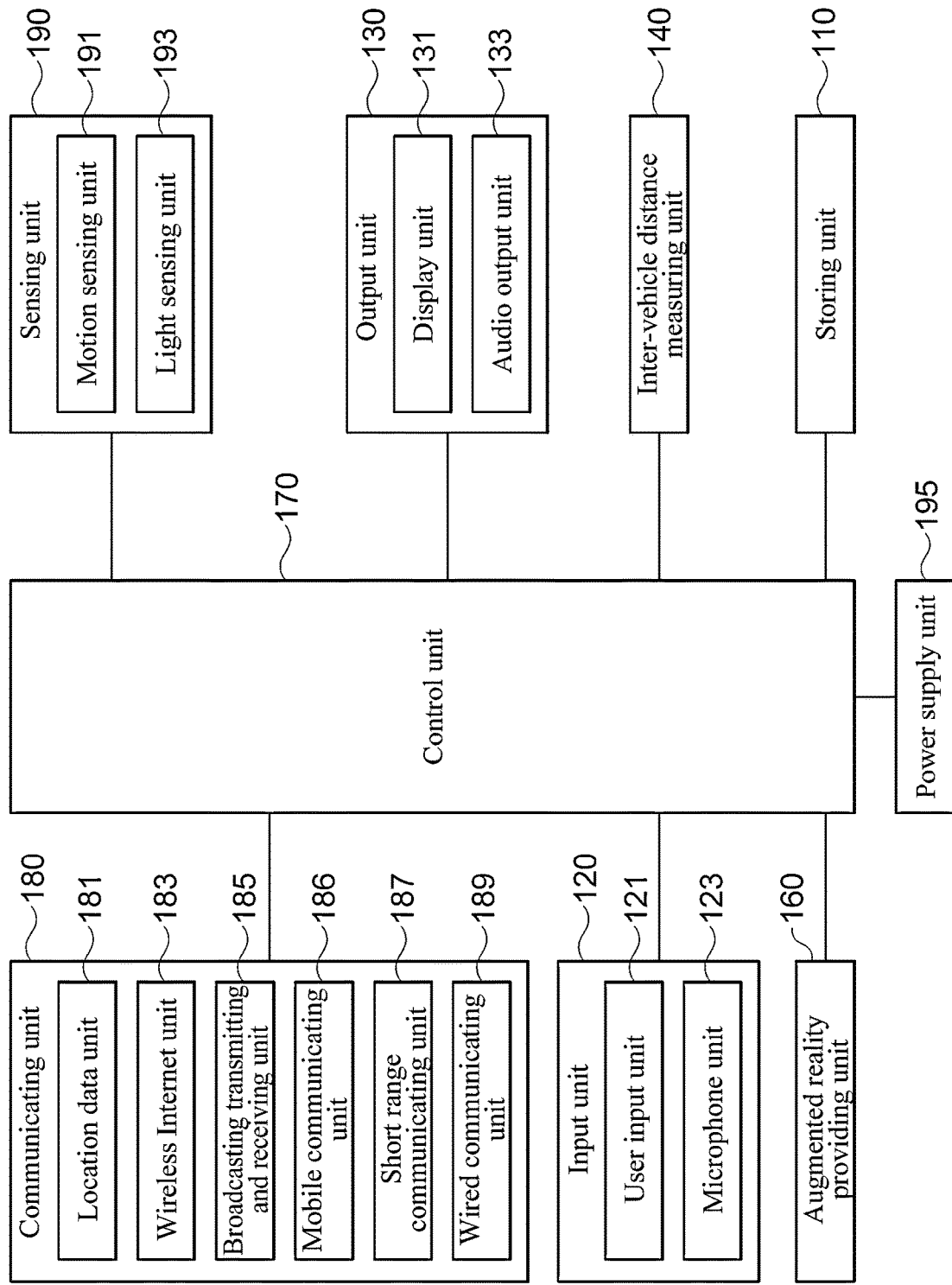
FIG. 17 is a block diagram illustrating an electronic device according to an exemplary embodiment of the present invention.

FIG. 17 is a block diagram illustrating an electronic device according to an exemplary embodiment of the present invention. Referring to FIG. 17, an electronic device 100 includes all or some of a storing unit 110, an input unit 120, an output unit 130, an inter-vehicle distance measuring unit 140, an augmented reality providing unit 160, a control unit 170, a communicating unit 180, a sensing unit 190, and a power supply unit 195.

Here, the electronic device 100 may be implemented as various devices such as a smartphone, a tablet computer, a notebook computer, a personal digital assistant (PDA), a portable multimedia player (PMP), a smart glasses, a project glasses, navigation, a car dash cam or a car video recorder, which is an image photographing device for a vehicle, and the like, that may provide driving related guidance to a driver of a vehicle, and may be provided in the vehicle.

The driving related guidance may include various kinds of guidance for assisting the driving of a driver of the vehicle, such as route guidance, marking lane departure guidance, lane maintenance guidance, front vehicle start guidance, traffic light change guidance, front vehicle collision prevention guidance, lane change guidance, lane guidance, curve guidance, and the like.

Here, the route guidance may include augmented reality route guidance performing route guidance by combining various information such as a position, a direction, and the like, of a user with an image obtained by photographing the front of the vehicle that is being driven and two-dimensional (2D) or three-dimensional (3D) route guidance performing route guidance by combining various information such as a position, a direction, and the like, of a user with a 2D or 3D map data.

Also, the route guidance may include an aerial map route guidance that performs the route guidance by combining various information such as the position, the direction, and the like of the user with aerial map data. Here, the route guidance may be interpreted as a concept including route guidance in the case in which the user walks or runs and moves as well as in the case in which the user gets in the vehicle and then drives the vehicle.

In addition, the marking lane departure guidance may be to guide whether or not the vehicle that is driving has departed from the marking lane.

In addition, the lane maintenance guidance may be to guide the vehicle to return to an original driving lane.

In addition, the front vehicle start guidance may be to guide whether or not a vehicle positioned in front of a vehicle that is being stopped has started. Here, the front vehicle start guidance may be performed using the inter-vehicle distance calculated by the inter-vehicle distance measuring unit 140.

In addition, the traffic light change guidance may be to guide whether a signal of a traffic light positioned in front of the vehicle that is being stopped is changed. As an example, the traffic light change guidance may be to guide that a state of the traffic light is changed from a red traffic light indicating a stop signal to a green traffic light indicating a start signal.

In addition, the front vehicle collision prevention guidance may be to guide that a distance between a vehicle that is being stopped or driving and a vehicle located in front of the vehicle is within a predetermined distance in order to prevent collision between the above-mentioned vehicles when the distance between the vehicle that is being stopped or driving and the vehicle located in front of the vehicle is within the predetermined distance. Here, the front vehicle collision prevention guidance may be performed using the inter-vehicle distance calculated by the inter-vehicle distance measuring unit 140.

In addition, the lane change guidance may be to guide a change from a lane on which the vehicle is located to a different lane in order to guide a route up to a destination.

In addition, the lane guidance may be to guide a lane on which the vehicle is currently located.

In addition, the curve guidance may be to guide that the road on which the vehicle will drive after a predetermined time is a curve.

A driving related image such as a front image of the vehicle enabling provision of various kinds of guidance may be photographed by a camera mounted in the vehicle or a camera of a smartphone. Here, the camera may be a camera formed integrally with the electronic device 100 mounted in the vehicle and photographing the front of the vehicle.

As another example, the camera may be a camera mounted in the vehicle separately from the electronic device 100 and photographing the front of the vehicle. In this case, the camera may be a separate image photographing device for a vehicle mounted toward the front of the vehicle, and the electronic device 100 may receive a photographed image through wired/wireless communication with the separately mounted image photographing device for a vehicle or receive the photographed image when a storage medium storing the photographed image of the image photographing device for a vehicle therein is inserted into the electronic device 100.

Hereinafter, the electronic device 100 according to an exemplary embodiment of the present invention will be described in more detail based on the above-mentioned content.

The storing unit 110 serves to store various data and applications necessary for the operation of the electronic device 100. In particular, the storing unit 110 may store data necessary for the operation of the electronic device 100, for example, an operating system (OS), a route search application, map data, and the like. In addition, the storing unit 110 may store data generated by the operation of the electronic device 100, for example, searched route data, a received image, and the like.

The storing unit 110 may be implemented as a detachable type of storing element such as a universal serial bus (USB)

memory, or the like, as well as an embedded type of storing element such as a random access memory (RAM), a flash memory, a read only memory (ROM), an erasable programmable ROM (EPROM), an electronically erasable and programmable ROM (EEPROM), a register, a hard disk, a removable disk, a memory card, a universal subscriber identity module (USIM), or the like.

The input unit 120 serves to convert a physical input from the outside of the electronic device 100 into a specific electrical signal. Here, the input unit 120 may include all or some of a user input unit 121 and a microphone unit 123.

The user input unit 121 may receive a user input such as a touch, a push operation, or the like. Here, the user input unit 121 may be implemented using at least one of the forms of various buttons, a touch sensor receiving a touch input, and a proximity sensor receiving an approaching motion.

The microphone unit 123 may receive a speech of the user and a sound generated from the inside and the outside of the vehicle.

The output unit 130 is a device that outputs data of the electronic device 100 to the user as an image and/or speech. Here, the output unit 130 may include all or some of a display unit 131 and an audio output unit 133.

The display unit 131 is a device for outputting data that may be visually recognized by the user. The display unit 131 may be implemented as a display unit provided on a front surface of a housing of the electronic device 100. In addition, the display unit 131 may be formed integrally with the electronic device 100 to output visual recognition data, or may be installed separately from the electronic device 100 like a head-up display (HUD) to output the visual recognition data.

The audio output unit 133 is a device for outputting data that may be acoustically recognized by the user. The audio output unit 133 may be implemented as a speaker that expresses data to be reported to the user of the electronic device 100 as sound.

The inter-vehicle distance measuring unit 140 may perform the functions of the apparatus 10 for measuring an inter-vehicle distance described above.

The augmented reality providing unit 160 may provide an augmented reality view mode. Here, augmented reality is a method of visually overlapping and providing additional information (e.g., a graphic element indicating a point of interest (POI), a graphic element guiding a front vehicle collision risk, a graphic element indicating an inter-vehicle distance, a graphic element guiding a curve, various additional information for assisting safe driving of the driver, and the like) with and on a screen including a real world actually viewed by the user.

Such an augmented reality providing unit 160 may include all or some of a calibration unit, a 3D space generating unit, an object generating unit, and a mapping unit.

The unit may perform calibration for estimating camera parameters corresponding to the camera from the photographed image photographed by the camera. Here, the camera parameters may be parameters configuring a camera matrix, which is information indicating a relationship between a real space and a photograph, and may include camera extrinsic parameters and camera intrinsic parameters.

The 3D space generating unit may generate a virtual 3D space based on the photographed image photographed by the camera. Specifically, the 3D space generating unit may generate the virtual 3D space by applying the camera parameters estimated by the calibration unit to a 2D photographed image.

The object generating unit may generate objects for guidance on the augmented reality, for example, a front vehicle collision prevention guidance object, a route guidance object, a lane change guidance object, a marking lane departure guidance object, a curve guidance object, and the like.

The mapping unit may map the object generated by the object generating unit to the virtual 3D space generated by the 3D space generating unit. Specifically, the mapping unit may determine a location of the object generated by the object generating unit in the virtual 3D space, and perform mapping of the object to the determined position.

Meanwhile, the communicating unit 180 may be provided in order for the electronic device 100 to communicate with other devices. The communicating unit 180 may include all or some of a location data unit 181, a wireless Internet unit 183, a broadcasting transmitting and receiving unit 185, a mobile communicating unit 186, a short range communicating unit 187, and a wired communicating unit 189.

The location data unit 181 is a device for acquiring location data through a global navigation satellite system (GNSS). The GNSS means a navigation system that may calculate a location of a receiving terminal using a radio wave signal received from a satellite. A detailed example of the GNSS may include a global positioning system (GPS), Galileo, a global orbiting navigational satellite system (GLONASS), COMPASS, an Indian regional navigational satellite system (IRNSS), a quasi-zenith satellite system (QZSS), and the like, depending on an operating subject of the GNSS. The location data unit 181 of the system according to an exemplary embodiment of the present invention may acquire the location data by receiving GNSS signals served in a zone in which the electronic device 100 is used. Alternatively, the location data unit 181 may also acquire the location data through communication with a base state or an access point (AP) in addition to the GNSS.

The wireless Internet unit 183 is a device for accessing wireless Internet to acquire or transmit data. The wireless Internet unit 183 may access the Internet network through various communication protocols defined to perform transmission and reception of wireless data of a wireless local area network (WLAN), a wireless broadband (Wibro), a world interoperability for microwave access (Wimax), a high speed downlink packet access (HSDPA), or the like.

The broadcasting transmitting and receiving unit 185 is a device for transmitting and receiving broadcasting signals through various broadcasting systems. The broadcasting system that may transmit and receive the broadcasting signals through the broadcasting transmitting and receiving unit 185 may be a digital multimedia broadcasting terrestrial (DMBT), a digital multimedia broadcasting satellite (DMBS), a media forward link only (MediaFLO), a digital video broadcast handheld (DVBH), an integrated services digital broadcast terrestrial (ISDBT), or the like. The broadcasting signals transmitted and received through the broadcasting transmitting and receiving unit 185 may include traffic data, living data, and the like.

The mobile communicating unit 186 may access a mobile communication network according to various mobile communication protocols such as 3rd generation (3G), 3rd generation partnership project (3GPP), long term evolution (LTE), and the like to communicate speech and data.

The short range communicating unit 187 is a device for short range communication. The short range communicating unit 187 may perform communication through Bluetooth, radio frequency identification (RFID), infrared data association (IrDA), ultra wideband (UWB), ZigBee, near field communication (NFC), wireless-fidelity (Wi-Fi), or the like, as described above.

The wired communicating unit 189 is an interface device that may connect the electronic device 100 to other devices in a wired scheme. The wired communicating unit 189 may be a USB module that may perform communication through a USB port.

The communicating unit 180 may communicate with other devices using at least one of the location data unit 181, the wireless Internet unit 183, the broadcasting transmitting and receiving unit 185, the mobile communicating unit 186, the short range communicating unit 187, and the wired communicating unit 189.

As an example, in the case in which the electronic device 100 does not include the camera function, the image photographed by the image photographing device for a vehicle such as the car dash cam or the car video recorder may be received using at least one of the short range communicating unit 187 and the wired communicating unit 189.

As another example, in the case in which the electronic device communicates with a plurality of devices, the electronic device may communicate with one of the plurality of devices through the short range communicating unit 187, and communicate with the other of the plurality of devices through the wired communicating unit 189.

The sensing unit 190 is a device that may detect a current state of the electronic device 100. The sensing unit 190 may include all or some of a motion sensing unit 191 and a light sensing unit 193.

The motion sensing unit 191 may detect a motion of the electronic device 100 in a 3D space. The motion sensing unit 191 may include a tri-axial terrestrial magnetism sensor and a tri-axial acceleration sensor. Motion data acquired through the motion sensing unit 191 may be combined with the location data acquired through the location data unit 181 to more accurately calculate a trajectory of the vehicle to which the electronic device 100 is attached.

The light sensing unit 193 is a device for measuring peripheral illuminance of the electronic device 100. Brightness of the display unit 131 may be changed so as to correspond to peripheral brightness using illuminance data acquired through the light sensing unit 193.

The power supply unit 195 is a device for supplying power necessary for an operation of the electronic device 100 or operations of other devices connected to the electronic device 100. The power supply unit 195 may be a device that receives power from a battery embedded in the electronic device 100 or an external power supply such as the vehicle or the like. In addition, the power supply unit 195 may be implemented as the wired communicating module 189 or a device that is wirelessly supplied with the power, depending on a scheme in which the power is supplied.

The control unit 170 controls an overall operation of the electronic device 100. Specifically, the control unit 170 may control all or some of the storing unit 110, the input unit 120, the output unit 130, the inter-vehicle distance measuring unit 140, the augmented reality providing unit 160, the communicating unit 180, the sensing unit 190, and the power supply unit 195.

Specifically, the control unit 170 may control the output unit 130 to output the front vehicle collision warning according to the inter-vehicle distance calculated by the inter-vehicle distance measuring unit 140. As an example, the output unit 130 may include the display unit 131 that combines the photographed driving image with a guidance object to output an augmented reality image. In this case, the control unit 170 may generate a guidance object for a front vehicle collision warning or a front vehicle start warning and control the display unit 131 to display the generated guidance object for front vehicle collision warning superimposed on a front vehicle display region of the augmented reality image.

If the front vehicle collision warning is performed, the guidance objects to be expressed may be displayed as different guidance objects according to a collision risk level corresponding to a distance difference between the first vehicle and the second vehicle. As an example, when the distance difference between the first vehicle and the second vehicle is divided into a plurality of levels, the control unit 170 may display a guidance object for guiding a first risk level when the inter-vehicle distance is smaller than a first value, may display a guidance object for guiding a second risk level having the degree of risk higher than the first risk level when the inter-vehicle distance is greater than the first value and smaller than a second value, and may display a guidance object for guiding a third risk level having the degree of risk higher than the second risk level when the inter-vehicle distance is greater than the second value.

Alternatively, if the front vehicle start warning is performed, the guidance objects to be expressed may be displayed as different guidance objects according to a start request level corresponding to the distance difference between the first vehicle and the second vehicle. As an example, when the distance difference between the first vehicle and the second vehicle is divided into a plurality of levels, the control unit 170 may display a guidance object for guiding a first start request level when the inter-vehicle distance is smaller than a first value, may display a guidance object for guiding a second start request level requiring a faster start than the first start request level when the inter-vehicle distance is greater than the first value and smaller than a second value, and may display a guidance object for guiding a third start request level requiring a faster start than the second start request level when the inter-vehicle distance is greater than the second value.

Figure 18:
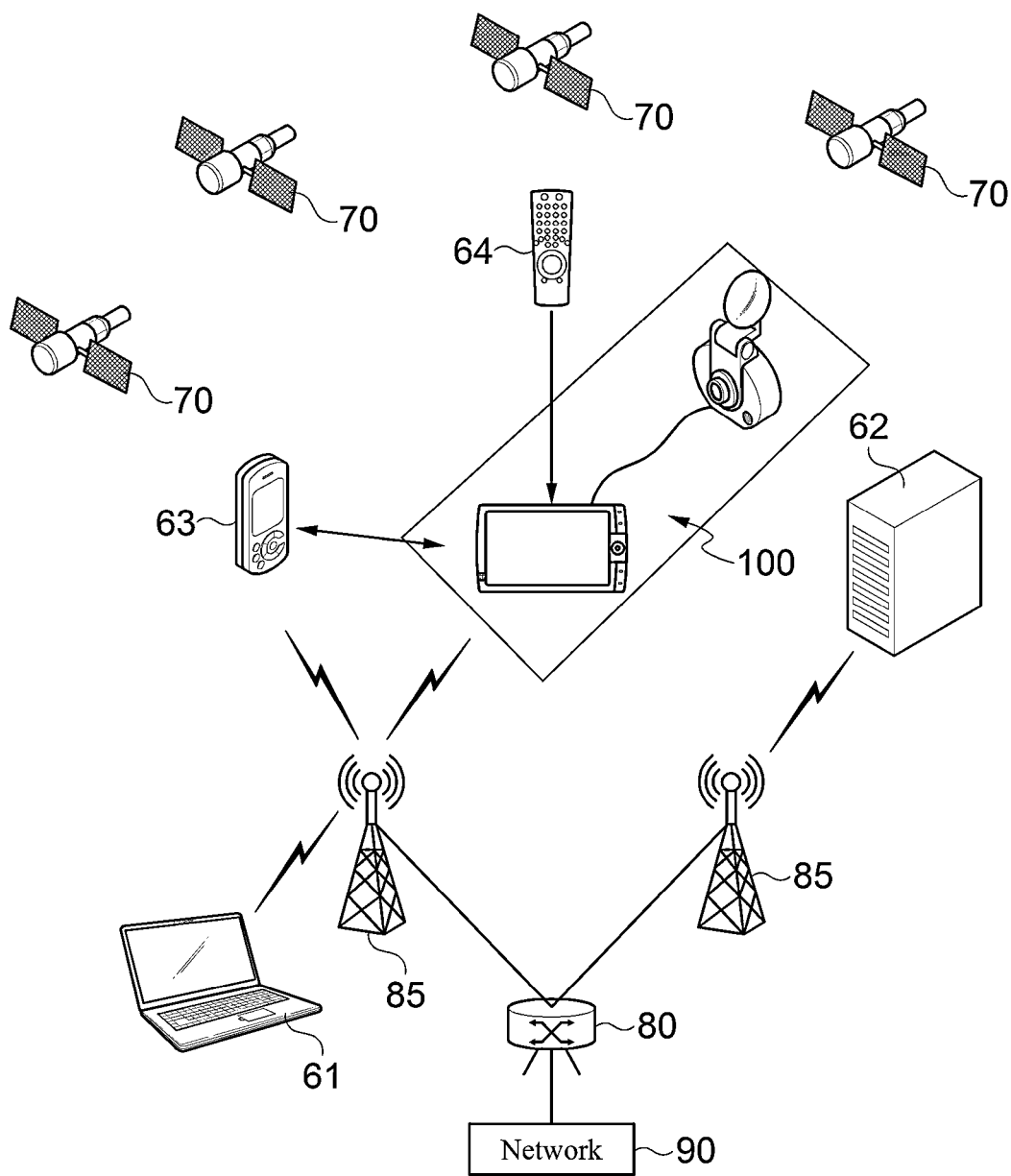
FIG. 18 is a diagram illustrating a system network connected to an electronic device according to an exemplary embodiment of the present invention.

FIG. 18 is a diagram illustrating a system network connected to an electronic device according to an exemplary embodiment of the present invention. Referring to FIG. 18, the electronic device 100 according to an exemplary embodiment of the present invention may be implemented as various devices provided in the vehicle, such as the navigation, the image photographing device for a vehicle, the smartphone, other augmented reality interface providing devices for a vehicle, or the like, and may be connected to various communication networks and other electronic devices 61 to 64.

In addition, the electronic device 100 may calculate the current location and the current time zone by interlocking a GPS module according to the radio wave signal received from a satellite 70.

Each satellite 70 may transmit L band frequencies of different frequency bands. The electronic device 100 may calculate the current location based on the time taken for the L band frequency transmitted from each satellite 70 to reach the electronic device 100.

Meanwhile, the electronic device 100 may wirelessly access a network 90 through an access control router (ACR) 80, a radio access station (RAS) 85, an access point (AP), and the like, via the communicating unit 180. When the electronic device 100 accesses the network 90, the electronic device 100 may indirectly access other electronic devices 61 and 62 that access the network 90 to exchange data.

Meanwhile, the electronic device 100 may also indirectly access the network 90 through another device 63 having a communication function. For example, when the electronic device 100 does not have a module that may access the network 90, the electronic device 100 may communicate with another device 63 having the communication function through a short range communication module, or the like.

Figure 19:
FIGS. 19 and 20 are diagrams illustrating a front vehicle collision prevention guide screen of the electronic device according to an exemplary embodiment of the present invention.
Figure 20:
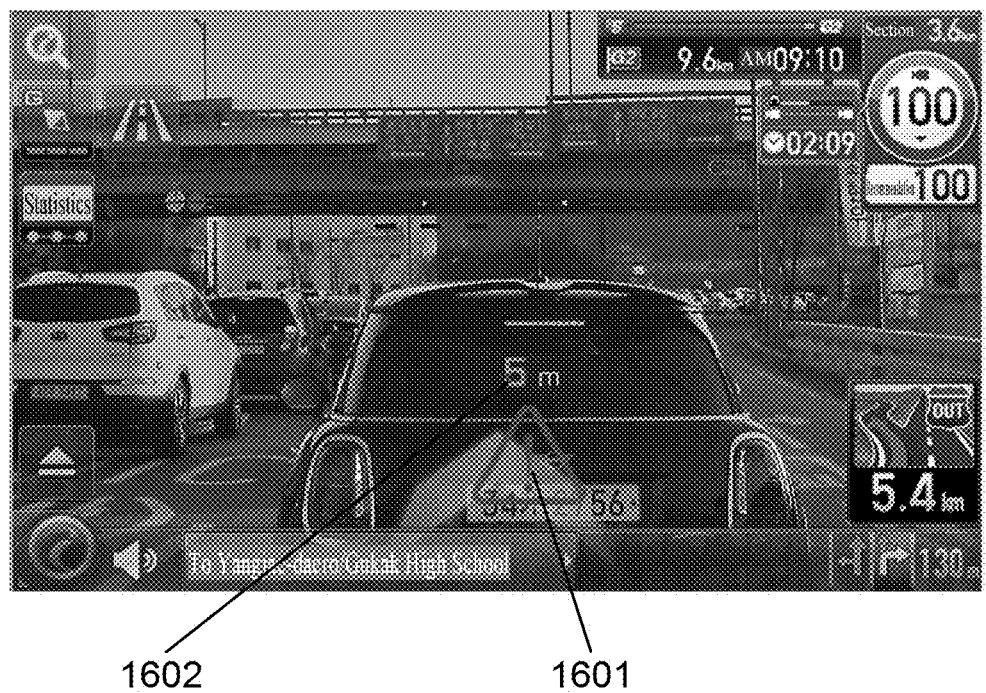

FIGS. 19 and 20 are diagrams illustrating a front vehicle collision prevention guide screen of the electronic device according to an exemplary embodiment of the present invention. Referring to FIGS. 19 and 20, the electronic device 100 may generate a guidance object indicating the degree of vehicle collision risk according to a distance between the own vehicle and the front vehicle and output the generated guidance object through the augmented reality.

As an example, as illustrated in FIG. 19, when the distance between the own vehicle and the front vehicle is a predetermined distance or more, the electronic device 100 may generate and display an attention guidance object 1501 for guiding that the user needs to pay attention.

In addition, as illustrated in FIG. 20, when the distance between the own vehicle and the front vehicle is close within the predetermined distance and the degree of collision risk with the front vehicle is increased, the electronic device 100 may generate and display a risk guidance object 1601 for guiding that there is a collision risk.

Here, the attention guidance object 1501 and the risk guidance object 1601 may be distinguished by different colors and sizes, thereby increasing visibility of the driver. In addition, the guidance objects 1501 and 1601 may be implemented, for example, as a texture image and expressed through the augmented reality.

In addition, in order for the driver to more easily recognize the distance with the front vehicle, the electronic device 100 may quantify the distance between the own vehicle and the front vehicle calculated by the inter-vehicle distance measuring unit 140 and display the quantified distance on the screen. As an example, the inter-vehicle distance measuring unit 140 may calculate an inter-vehicle distance between the own vehicle and the front vehicle, and the electronic device 100 may generate the guidance objects 1502 and 1602 indicating the inter-vehicle distance and display the guidance objects on the screen.

In addition, the electronic device 100 may also output various guidances through speech.

Figure 21:
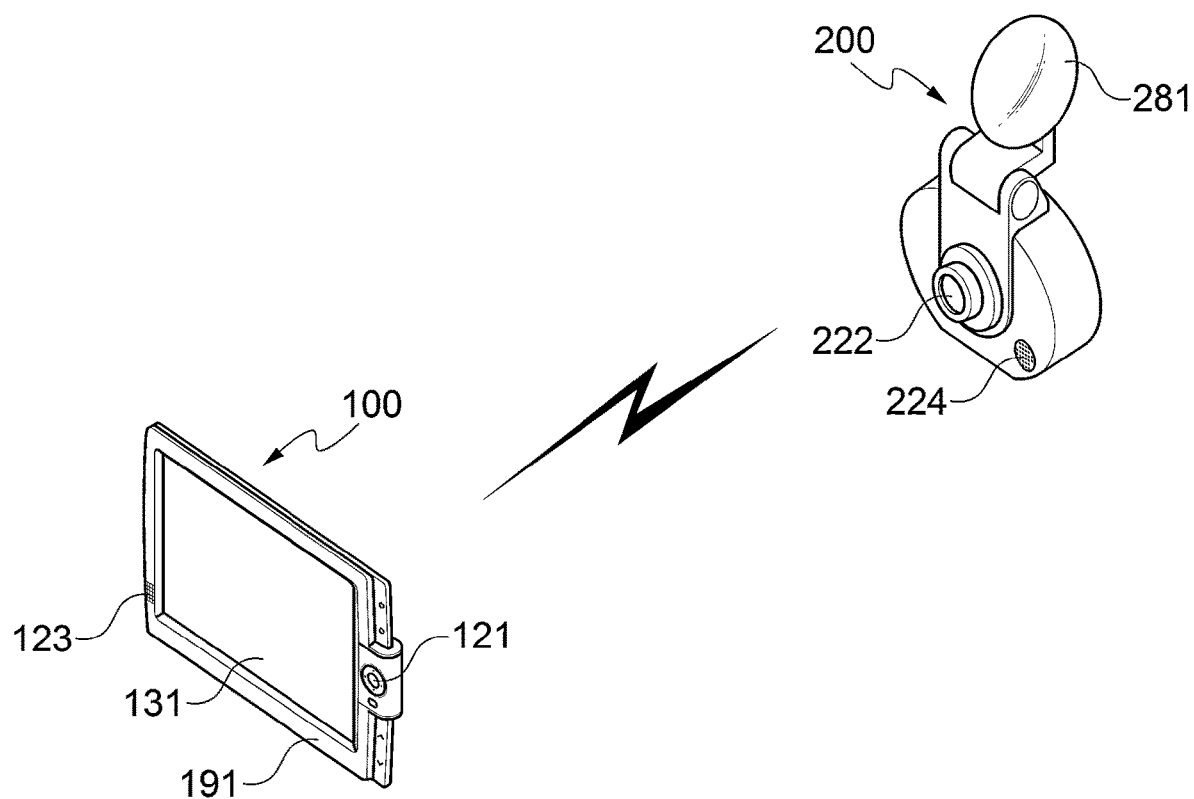
FIG. 21 is a diagram illustrating an implementation form of a case in which the electronic device according to an exemplary embodiment of the present invention does not include a photographing unit.

FIG. 21 is a diagram illustrating an implementation form of a case in which the electronic device according to an exemplary embodiment of the present invention does not include a photographing unit. Referring to FIG. 21, the electronic device 100 and an image photographing device 200 for a vehicle which is separately provided may configure a system according to an exemplary embodiment of the present invention using a wired/wireless communication scheme.

The electronic device 100 may include the display unit 131, the user input unit 121, and the microphone unit 123 which are provided on a front surface of a housing 191.

The image photographing device 200 for a vehicle may include a camera 222, a microphone 224, and an attaching part 281.

Figure 22:
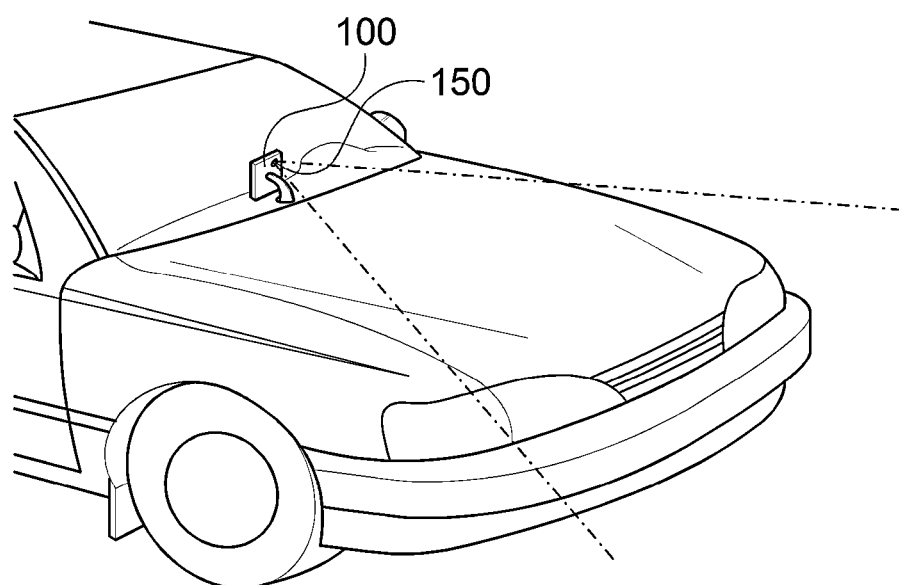
FIG. 22 is a diagram illustrating an implementation form of a case in which the electronic device according to an exemplary embodiment of the present invention includes a photographing unit.

FIG. 22 is a diagram illustrating an implementation form of a case in which the electronic device according to an exemplary embodiment of the present invention includes a photographing unit. Referring to FIG. 22, in the case in which the electronic device 100 includes a photographing unit 150, the photographing unit 150 of the electronic device 100 may be a device for photographing the front of the vehicle and allowing the user to recognize a display portion of the electronic device 100. Therefore, the system according to an exemplary embodiment of the present invention may be implemented.

Figure 23:
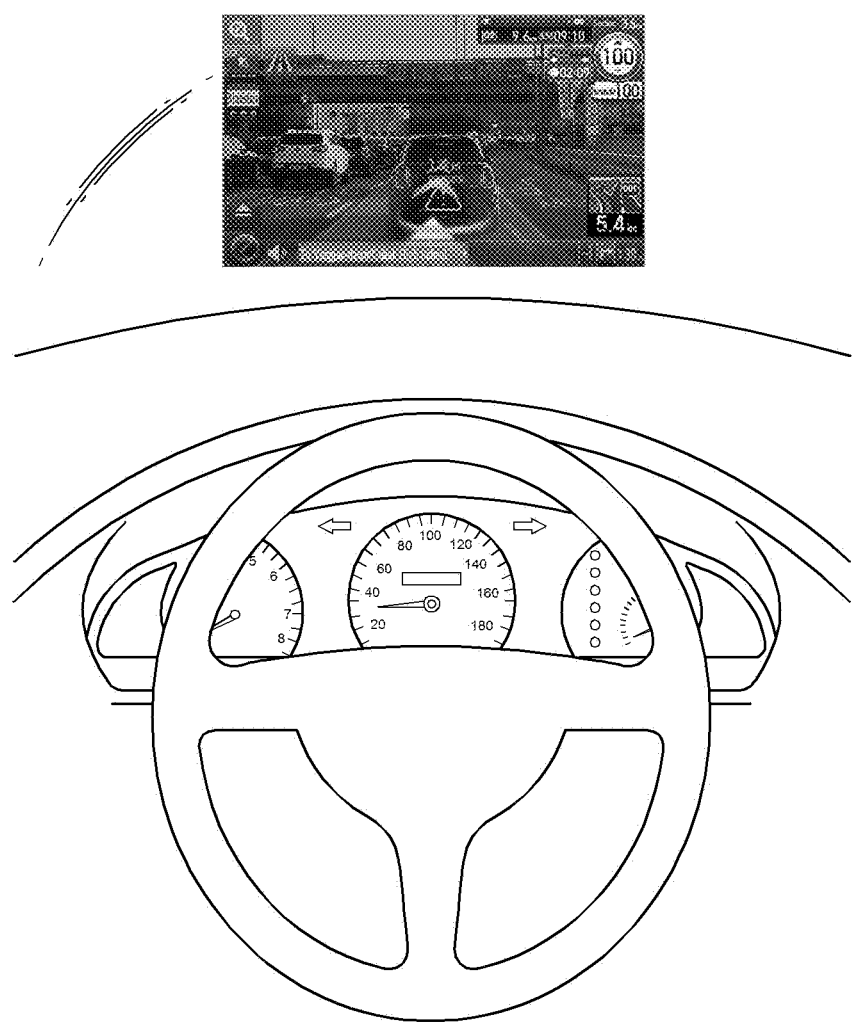
FIG. 23 is a diagram illustrating an implementation form using a head-up display (HUD) according to an exemplary embodiment of the present invention.

FIG. 23 is a diagram illustrating an implementation form using a head-up display (HUD) according to an exemplary embodiment of the present invention. Referring to FIG. 23, the HUD may display an augmented reality guide screen on the head-up display through wired/wireless communication with other devices.

As an example, the augmented reality may be provided through the HUD using a front glass of the vehicle, an image overlay using a separate image output device, or the like, and the augmented reality providing unit 160 may generate an interface image overlaid on the reality image or the glass as described above. In this way, augmented reality navigation or vehicle infotainment system may be implemented.

Meanwhile, the apparatus 10 for measuring an inter-vehicle distance may be implemented as one module of a system for autonomous driving to perform a route guidance function. This will be described in more detail with reference to FIGS. 24 and 25.

Figure 24:
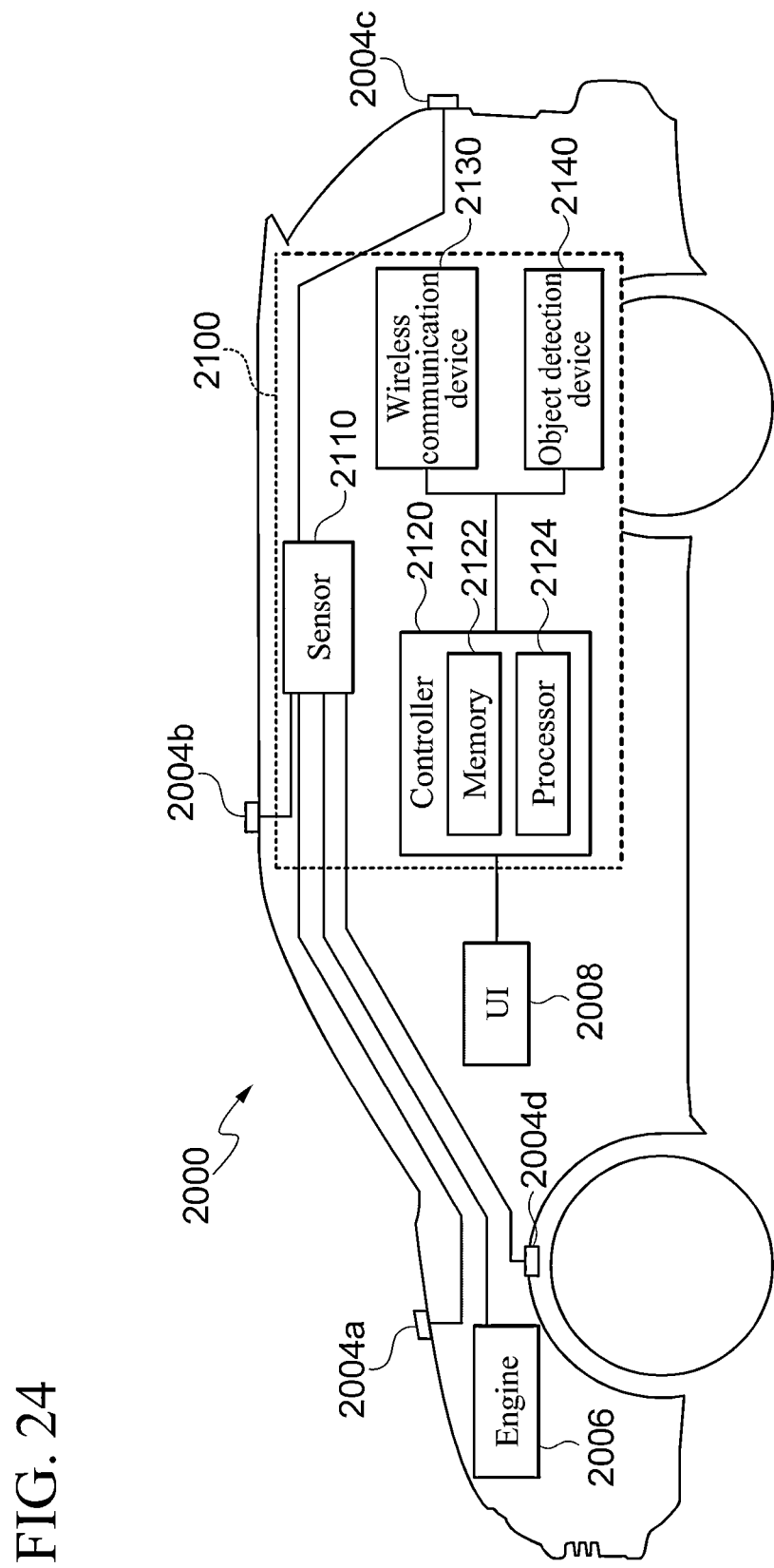
FIG. 24 is a block diagram illustrating an autonomous driving system according to an exemplary embodiment of the present invention.

FIG. 24 is a block diagram illustrating components of an autonomous vehicle according to an exemplary embodiment of the present invention. Referring to FIG. 24, the autonomous vehicle 2000 according to the present exemplary embodiment may include the control device 2100, sensing modules 2004a, 2004b, 2004c, and 2004d, an engine 2006, and a user interface 2008.

The autonomous vehicle 2000 may have an autonomous driving mode or a manual mode. As an example, according to a user input received through the user interface 2008, the manual mode may be switched to the autonomous driving mode, or the autonomous driving mode may be switched to the manual mode.

When the vehicle 2000 is operated in the autonomous driving mode, the autonomous vehicle 2000 may be operated under the control of the control device 2100.

In the present exemplary embodiment, the control device 2100 may include a controller 2120 including the memory 2122 and the processor 2124, a sensor 2110, a wireless communication device 2130, and an object detection device 2140.

In the present exemplary embodiment, the object detection device 2140 is a device for detecting an object located outside the vehicle 2000, and may detect an object located outside the vehicle 2000 and may generate object information according to the detection result.

The object information may include information on the presence or absence of an object, location information of the object, distance information between the vehicle and the object, and relative speed information between the vehicle and the object.

The object may include various objects located outside the vehicle 2000 such as marking lanes, other vehicles, pedestrians, traffic signals, lights, roads, structures, speed bumps, terrain objects, animals, and the like. Here, the traffic signal may be a concept including a traffic light, a traffic sign, and a pattern or text drawn on a road surface. In addition, the light may be light generated from a lamp provided in another vehicle, light generated from a street lamp, or sunlight.

In addition, the structure may be an object located around a road and fixed to the ground. For example, the structure may include street lights, street trees, buildings, power poles, traffic lights, and bridges. The terrain object may include mountains, hills, and the like.

The object detection device 2140 may include a camera module. The controller 2120 may extract object information from an external image photographed by the camera module and allow the controller 2120 to process information about the object information.

In addition, the object detection device 2140 may further include imaging devices for recognizing an external environment. In addition to the LIDAR, RADAR, a GPS device, odometry and other computer vision devices, ultrasonic sensors, and infrared sensors may be used, and these devices may be selectively or simultaneously operated as needed to allow more precise detection.

In addition, the sensor 2110 may acquire various types of sensing information by connecting the sensing modules 2004a, 2004b, 2004c, and 2004d that senses a vehicle interior/external environment. Here, the sensor 2110 may include an attitude sensor (e.g., yaw sensor, roll sensor, pitch sensor), a collision sensor, a wheel sensor, a speed sensor, an inclination sensor, a weight detection sensor, a heading sensor, a gyro sensor, a position module, a vehicle forward/reverse sensor, a battery sensor, a fuel sensor, a tire sensor, a steering sensor by steering wheel rotation, an in-vehicle temperature sensor, an in-vehicle humidity sensor, an ultrasonic sensor, an illuminance sensor, an accelerator pedal position sensor, a brake pedal position sensor, and the like.

Accordingly, the sensor 2110 may acquire sensing information on vehicle attitude information, vehicle collision information, vehicle direction information, vehicle position information (GPS information), vehicle angle information, vehicle speed information, vehicle acceleration information, vehicle tilt information, vehicle forward/reverse information, battery information, fuel information, tire information, vehicle ramp information, in-vehicle temperature information, in-vehicle humidity information, steering wheel rotation angle, vehicle exterior illumination, pressure applied to an accelerator pedal, pressure applied to a brake pedal, and the like.

In addition, the sensor 2110 may further include an accelerator pedal sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

As such, the sensor 2110 may generate vehicle state information based on sensing data.

The wireless communication device 2130 is configured to implement wireless communication between the autonomous vehicles 2000. For example, the wireless communication device 2130 allows the autonomous vehicle 2000 to communicate with a user's mobile phone or other wireless communication device 2130, another vehicle, a central device (traffic control device), a server, and the like. The wireless communication device 2130 may transmit and receive a wireless signal according to an access wireless protocol. The wireless communication protocol may be Wi-Fi, Bluetooth, long-term evolution (LTE), code division multiple access (CDMA), wideband code division multiple access (WCDMA), or global systems for mobile communications (GSM), but the communication protocol is not limited thereto.

In addition, in the present exemplary embodiment, the autonomous vehicle 2000 may also implement vehicle-to-vehicle communication through the wireless communication device 2130. That is, the wireless communication device 2130 may communicate with other vehicles on the road through vehicle-to-vehicle communication (V2V). The autonomous vehicle 2000 may transmit and receive information such as driving warning and traffic information through vehicle-to-vehicle communication, and may also request a request to or receive the request from another vehicle. For example, the wireless communication device 2130 may perform the V2V communication using a dedicated short-range communication (DSRC) device or a cellular-V2V (C-V2V) device. In addition, in addition to the vehicle-to-vehicle communication, vehicle to everything communication (V2X) between the vehicle and other objects (e.g., an electronic device carried by a pedestrian) may be implemented through the wireless communication device 2130.

In the present exemplary embodiment, the controller 2120 is a unit that controls the overall operation of each unit in the vehicle 2000, and may be configured at the time of manufacture by the manufacturer of the vehicle or may be additionally configured to perform a function of autonomous driving after the manufacture. Alternatively, a component for performing a continuous additional function through an upgrade of the controller 2120 configured at the time of manufacture may be included. Such a controller 2120 may be referred to as an electronic control unit (ECU).

The controller 2120 may collect various data from the sensor 2110, the object detection device 2140, the wireless communication device 2130, and the like that are connected thereto, and transmit a control signal to the sensor 2110, the engine 2006, the user interface 2008, the wireless communication device 2130, and the object detection device 2140, which are included as other components in the vehicle, based on the collected data. In addition, although not illustrated, the controller 2120 may also transmit the control signals to an accelerator, a braking system, a steering device, or a navigation device associated with driving of the vehicle.

In the present exemplary embodiment, the controller 2120 may control the engine 2006, for example, may detect a speed limit of the road on which the autonomous vehicle 2000 is driving and control the engine 2006 such that the driving speed does not exceed the speed limit, or may control the engine 2006 to accelerate the driving speed of the autonomous vehicle 2000 within a range not exceeding the speed limit.

In addition, the controller 2120 may detect a distance to the vehicle located in front of the autonomous vehicle 2000 while driving of the autonomous vehicle 2000, and control the engine 2006 to control the driving speed according to the inter-vehicle distance. Specifically, the autonomous vehicle 2000 may be equipped with the apparatus 10 for measuring an inter-vehicle distance according to an exemplary embodiment of the present invention, and the apparatus 10 for measuring an inter-vehicle distance may measure the distance between the vehicle 1000 and the target vehicle, and transmit the measured inter-vehicle distance value to the controller 2120.

In this case, the controller 2120 may control autonomous driving of the vehicle by controlling deceleration, acceleration, and constant speed of the vehicle 2000 based on the inter-vehicle distance information obtained from the apparatus 10 for measuring an inter-vehicle distance. Specifically, when the acquired inter-vehicle distance is smaller than a predetermined distance, the controller 2120 may control a speed of the vehicle 2000 to be reduced from a current speed to a predetermined speed or control various units (brake, steering wheel, etc.) provided in the vehicle 2000 to stop the vehicle 2000. That is, the controller 2120 may control the autonomous driving of the vehicle 2000 based on the inter-vehicle distance acquired from the apparatus 10 for measuring an inter-vehicle distance.

In addition, according to another exemplary embodiment of the present invention, the controller 2120 may also control a driving speed by generating a command to the driving device of the vehicle 2000 so that the inter-vehicle distance acquired from the apparatus 10 for measuring an inter-vehicle distance maintains a predetermined distance.

In addition, according to another exemplary embodiment of the present invention, when the inter-vehicle distance acquired from the apparatus 10 for measuring an inter-vehicle distance is greater than the predetermined distance, the controller 2120 may control various units (brake, steering wheel, etc) provided in the vehicle 2000 to increase the speed of the vehicle 2000 from the current speed to a predetermined speed. That is, the controller 2120 may control the autonomous driving of the vehicle 2000 based on the inter-vehicle distance acquired from the apparatus 10 for measuring an inter-vehicle distance.

The apparatus 10 for measuring an inter-vehicle distance may be configured as a module in the control device 2100 of the autonomous vehicle 2000. That is, a memory 2122 and a processor 2124 of the control device 2100 may implement the method for measuring an inter-vehicle distance according to the present invention as software.

If there is another vehicle or obstruction in front of the vehicle, the controller 2120 may control the engine 2006 or the braking system to decelerate the driving vehicle, and control a trajectory, a driving route, and a steering angle in addition to the speed. Alternatively, the controller 2120 may control the driving of the vehicle by generating a necessary control signal according to recognition information of other external environments such as a driving traffic lane, a driving signal, or the like of the vehicle.

In addition to generating its own control signal, the controller 2120 may also control the driving of the vehicle by performing communication with a peripheral vehicle or a central server and transmitting a command for controlling the peripheral devices through the received information.

In addition, when the location of the camera module 2150 is changed or the angle of view is changed, it may be difficult to accurately recognize the vehicle or marking lane according to the present exemplary embodiment. Therefore, in order to prevent such a problem, the controller 2120 may also generate a control signal for controlling the camera module 2150 to be calibrated. Therefore, in the present exemplary embodiment, since the controller 2120 generates a calibration control signal with the camera module 2150, the normal mounting position, direction, and angle of view of the camera module 2150 may be continuously maintained even if the mounting position of the camera module 2150 is changed due to vibration or shock generated according to the movement of the autonomous vehicle 2000, When information on the initial mounting location, direction, and angle of view of the camera module 2150 stored in advance and information on the initial mounting position, direction, and angle of view of the camera module 2150 measured while the autonomous vehicle 2000 is driving are changed to a threshold value or more, the controller 2120 may generate a control signal to calibrate the camera module 2150.

In the present exemplary embodiment, the controller 2120 may include the memory 2122 and the processor 2124. The processor 2124 may execute software stored in the memory 2122 according to the control signal of the controller 2120. Specifically, the controller 2120 may store data and instructions for performing the method for measuring an inter-vehicle distance according to the present invention in the memory 2122, and the instructions may be executed by the processor 2124 to implement one or more methods disclosed herein.

In this case, the memory 2122 may be stored in a recording medium executable by a non-volatile processor 2124. The memory 2122 may store software and data through appropriate internal and external devices. The memory 2122 may include a random access memory (RAM), a read only memory (ROM), a hard disk, and a memory 2122 device connected to a dongle.

The memory 2122 may store at least an operating system (OS), a user application, and executable instructions. The memory 2122 may also store application data and array data structures.

The processor 2124 may be a controller, a microcontroller, or a state machine as a microprocessor or a suitable electronic processor.

The processor 2124 may be implemented in a combination of computing devices, and the computing device may be a digital signal processor, a microprocessor, or an appropriate combination thereof.

Meanwhile, the autonomous vehicle 2000 may further include the user interface 2008 for user input to the control device 2100 described above. The user interface 2008 may allow a user to input information with appropriate interaction. For example, the user interface 2008 may be implemented as a touch screen, a keypad, an operation button, or the like. The user interface 2008 may transmit an input or a command to the controller 2120 and the controller 2120 may perform a control operation of the vehicle in response to the input or the command.

In addition, the user interface 2008 may allow a device outside the autonomous vehicle 2000 to communicate with the autonomous vehicle 2000 through the wireless communication device 2130. For example, the user interface 2008 may allow the autonomous vehicle 2000 to interact with a mobile phone, tablet, or other computer device.

Further, in the present exemplary embodiment, although the autonomous vehicle 2000 has been described as including the engine 2006, it is also possible to include other types of propulsion systems. For example, the vehicle may be driven by electrical energy and may be driven through a hybrid system of hydrogen energy or a combination thereof. Therefore, the controller 2120 may include a propulsion mechanism according to the propulsion system of the autonomous vehicle 2000, and provide control signals according to the propulsion mechanism to the components of each propulsion mechanism.

Figure 25:
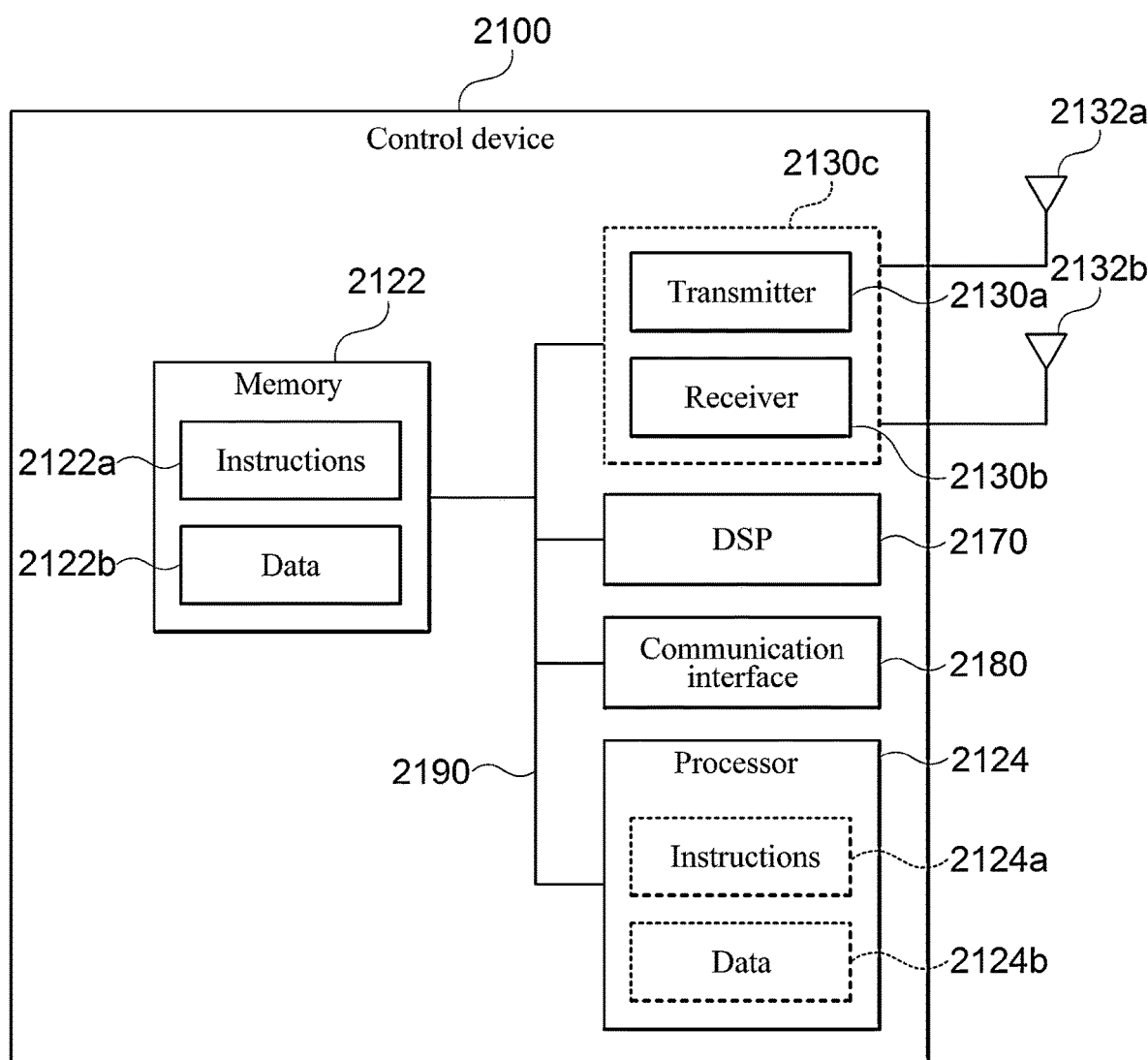
FIG. 25 is a block diagram illustrating components of an autonomous vehicle according to an exemplary embodiment of the present invention.

Hereinafter, a detailed configuration of the control device 2100 for performing the method for measuring an inter-vehicle distance according to the present exemplary embodiment will be described in detail with reference to FIG. 25.

The control device may include the processor 2124. The processor 2124 may be a general purpose single or multi-chip microprocessor, a dedicated microprocessor, a microcontroller, a programmable gate array, or the like. The processor may be referred to as a central processing unit (CPU). In addition, in the present exemplary embodiment, the processor 2124 may also be used in combination with a plurality of processors.

The control device 2100 may also include the memory 2122. The memory 2122 may be any electronic component capable of storing electronic information. The memory 2122 may also include a combination of memories 2122 in addition to a single memory.

Data and instructions 2122a for performing the method for measuring an inter-vehicle distance according to the present invention may be stored in the memory 2122. When the processor 2124 executes the instructions 2122a, all or some of the instructions 2122a and the data 2122b required for the execution of the instructions may be loaded 2124a and 2124b onto the processor 2124.

The control device 2100 may include a transmitter 2130a, a receiver 2130b, or a transceiver 2130c to allow transmission and reception of signals. One or more antennas 2132a and 2132b may be electrically connected to the transmitter 2130a, the receiver 2130b, or each transceiver 2130c and may further include antennas.

The control device 2100 may include a digital signal processor (DSP) 2170. The DSP 2170 may allow the vehicle to process digital signals quickly.

The control device 2100 may also include a communication interface 2180. The communication interface 2180 may include one or more ports and/or communication modules for connecting other devices with the control device 2100. The communication interface 2180 may enable the user and the control device 2100 to interact.

Various components of the control device 2100 may be connected together by one or more buses 2190, and the buses 2190 may include a power bus, a control signal bus, a state signal bus, a data bus, and the like. Under the control of the processor 2124, the components may transmit information to each other through the bus 2190 and perform a desired function.

Meanwhile, in the above-mentioned exemplary embodiments, for convenience of explanation, although it has been described that the distance between the reference vehicle and the front vehicle is calculated as an example, but the present invention is not limited thereto. The method for measuring an inter-vehicle distance according to the present invention may be equally applied to a case of calculating a distance between the reference vehicle and a rear vehicle.

Meanwhile, in the specification and the claims, terms such as "first", "second", "third", "fourth", and the like, if any, will be used to distinguish similar components from each other and be used to describe a specific sequence or a generation sequence, but is not necessarily limited thereto. It will be understood that these terms are compatible with each other under an appropriate environment so that exemplary embodiments of the present invention set forth herein may be operated in a sequence different from a sequence illustrated or described herein. Likewise, in the case in which it is described herein that a method includes a series of steps, a sequence of these steps suggested herein is not necessarily a sequence in which these steps may be executed. That is, any described step may be omitted and/or any other step that is not described herein may be added to the method. For example, the first component may be referred to as a second component, and similarly, the second component may be referred to as a first component, without departing from the scope of the present invention.

In addition, in the specification and the claims, terms such as"left", "right", "front", "rear", "top", "bottom", "over", "under", and the like, if any, do not necessarily indicate relative positions that are not changed, but are used for explanation. It will be understood that these terms are compatible with each other under an appropriate environment so that exemplary embodiments of the present invention set forth herein may be operated in a sequence different from a sequence illustrated or described herein. A term "connected" used herein is defined as being directly or indirectly connected in an electrical or non-electrical scheme. Here, targets described as being "adjacent to" each other may physically contact each other, be close to each other, or be in the same general range or region, in a context in which the above phrase is used. Here, a phrase "in an exemplary embodiment" means the same exemplary embodiment, but is not necessarily limited thereto.

In addition, in the specification and the claims, terms such as "connected", "connecting", "linked", "linking", "coupled", "coupling", and the like, and various modifications of these terms may be used as the meaning including that one component is directly connected to another component or is indirectly connected to another component through the other component.

On the other hand, it is to be understood that when one component is referred to as being "connected directly to" or "coupled directly to" another component, it may be connected to or coupled to another component without the other component intervening therebetween.

In addition, terms "module" and "unit" for components used in the present specification are used only in order to easily make the specification. Therefore, these terms do not have meanings or roles that distinguish from each other in themselves.

Terms used in the present specification are for explaining exemplary embodiments rather than limiting the present invention. In the present specification, a singular form includes a plural form unless explicitly described to the contrary. In the specification, it is to be noted that the term "configured" or "including" is not construed as necessarily including several components or several steps described in the specification and some of the above components or steps may not be included or additional components or steps are construed as being further included.

Hereinabove, the present invention has been described with reference to the exemplary embodiments thereof. All exemplary embodiments and conditional illustrations disclosed in the present specification have been described to intend to assist in the understanding of the principle and the concept of the present invention by those skilled in the art to which the present invention pertains. Therefore, it will be understood by those skilled in the art to which the present invention pertains that the present invention may be implemented in modified forms without departing from the spirit and scope of the present invention.

Therefore, the exemplary embodiments disclosed herein should be considered in an illustrative aspect rather than a restrictive aspect. The scope of the present invention should be defined by the claims rather than the above-mentioned description, and equivalents to the claims should be interpreted to fall within the present invention.

Meanwhile, the method for measuring an inter-vehicle distance according to various exemplary embodiments of the present invention described above may be implemented as programs and be provided to servers or devices. Therefore, the respective apparatuses may access the servers or the devices in which the programs are stored to download the programs.

In addition, the control method according to various exemplary embodiments of the present invention described above may be implemented as programs and be provided in a state in which it is stored in various non-transitory computer readable media. The non-transitory computer readable medium is not a medium that stores data for a short time such as a register, a cache, a memory, or the like, but means a machine readable medium that semi-permanently stores data. Specifically, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

According to various exemplary embodiments of the present invention described above, even though the target vehicle may not be detected through the driving image because the lower portion of the target vehicle is not photographed as the distance the own vehicle and the target vehicle for distance measurement is closer, the distance between the own vehicle and the target vehicle may be accurately measured through the feature point tracking.

Further, according to various exemplary embodiments of the present invention, in a short distance, a fast processing speed may be achieved even in low performance terminals through feature point-based tracking, and real-time processing is possible.

Further, according to various exemplary embodiments of the present invention, even though the region of the target vehicle is obscured as the distance between the own vehicle and the target vehicle is close, the collision notification function and the departure notification function may be accurately performed.

Further, according to various exemplary embodiments of the present invention, even though the region of the target vehicle is obscured as the distance between the own vehicle and the target vehicle is close, autonomous driving control for the own vehicle may be accurately performed by accurately calculating the distance between the own vehicle and the target vehicle.

Although the exemplary embodiments of the present invention have been illustrated and described hereinabove, the present invention is not limited to the specific exemplary embodiments described above, but may be variously modified by those skilled in the art to which the present invention pertains without departing from the scope and spirit of the present invention as claimed in the claims. These modifications should also be understood to fall within the technical spirit and scope of the present invention.

What is claimed is:

1. An apparatus configured to be installed in a first vehicle, the apparatus comprising:
   a camera configured to acquire at least one of image in unit of frame; and
   a processor configured to detect in the image a second vehicle which is located in front of the first vehicle, and configured to calculate a distance to the second vehicle sequentially by using a first procedure and a second procedure, the second procedure being different from the first procedure,
   wherein the first procedure is used to detect the second vehicle in a current frame acquired by the camera, and
   wherein the second procedure is used to detect the second vehicle in a previous frame acquired by the camera when the second vehicle is not detected by the first procedure.

2. The apparatus of claim 1, wherein the first procedure is based on machine learning or deep learning and the second procedure is based on feature points tracking in the image.

3. The apparatus of claim 1, wherein the processor is further configured to detect in the image at least one feature point of the second vehicle.

4. The apparatus of claim 3, wherein the second procedure comprising the instructions of:
   predicting a size of the second vehicle in the current frame where the second vehicle is not detected, based on first feature points of the second vehicle in the previous frame where the second vehicle is detected; and
   calculating a distance to the second vehicle based on a plurality of variables including the predicted size of the second vehicle.

5. The apparatus of claim 4, wherein the size of the second vehicle includes width of the second vehicle in the current frame.

6. The apparatus of claim 4, wherein the first feature points are in the middle region of the second vehicle.

7. The apparatus of claim 3, wherein the second procedure comprising the instructions of:
   predicting a size of the second vehicle in the current frame where the second vehicle is not detected, based on first feature points of the second vehicle in the previous frame where the second vehicle is detected and based on second feature points of the second vehicle in the current frame, wherein the second feature points are obtained by tracking the first feature points; and
   calculating a distance to the second vehicle based on a plurality of variables including the predicted size of the second vehicle.

8. The apparatus of claim 7, wherein the plurality of variables further includes a first average pixel distance obtained by averaging pixel distances between average pixel position of the first feature points and the first feature points, and a second average pixel distance obtained by averaging pixel distances between average pixel position of the second feature points and the second feature points.

9. The apparatus of claim 8, wherein the plurality of variables further includes focal length of the camera, and a size class of the second vehicle.

10. A method performed by an apparatus configured to be installed in a first vehicle, the method comprising:
    acquiring at least one of image in unit of frame by a camera;
    detecting in the image a second vehicle which is located in front of the first vehicle; and
    calculating a distance to the second vehicle by sequentially using a first procedure and a second procedure, the second procedure being different from the first procedure,
    wherein the first procedure is used to detect the second vehicle in a current frame acquired by the camera, and
    wherein the second procedure is used to detect the second vehicle in a previous frame acquired by the camera when the second vehicle is not detected by the first procedure.

11. The method of claim 10, wherein the first procedure is based on machine learning or deep learning and the second procedure is based on feature points tracking in the image.

12. The method of claim 10 further comprising:
    detecting in the image at least one feature point of the second vehicle.

13. The method of claim 12, wherein the second procedure comprising the instructions of:
    predicting a size of the second vehicle in the current frame where the second vehicle is not detected, based on first feature points of the second vehicle in the previous frame where the second vehicle is detected; and
    calculating a distance to the second vehicle based on a plurality of variables including the predicted size of the second vehicle.

14. A non-transitory computer readable storage medium configured to be installed in a first vehicle, the storage medium containing instructions to perform a method comprising:

acquiring at least one of image in unit of frame by a camera;

detecting in the image a second vehicle which is located in front of the first vehicle; and calculating a distance to the second vehicle by sequentially using a first procedure and a second procedure, the second procedure being different from the first procedure, wherein the first procedure is used to detect the second vehicle in a current frame acquired by the camera, and wherein the second procedure is used to detect the second vehicle in a previous frame acquired by the camera when the second vehicle is not detected by the first procedure.

15. The non-transitory computer readable storage medium of claim 14, wherein the first procedure is based on machine learning or deep learning and the second procedure is based on feature points tracking in the image.

16. The non-transitory computer readable storage medium of claim 14, wherein the method further comprises:

detecting in the image at least one feature point of the second vehicle.

17. The non-transitory computer readable storage medium of claim 16, wherein the second procedure comprising the instructions of:

predicting a size of the second vehicle in the current frame where the second vehicle is not detected, based on first feature points of the second vehicle in the previous frame where the second vehicle is detected; and calculating a distance to the second vehicle based on a plurality of variables including the predicted size of the second vehicle.

* * * * *